(12) United States Patent
Freimuth et al.

(10) Patent No.: US 8,346,997 B2
(45) Date of Patent: Jan. 1, 2013

(54) USE OF PERIPHERAL COMPONENT INTERCONNECT INPUT/OUTPUT VIRTUALIZATION DEVICES TO CREATE REDUNDANT CONFIGURATIONS

(75) Inventors: Douglas M. Freimuth, New York, NY (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/332,957

(22) Filed: Dec. 11, 2008

(65) Prior Publication Data

US 2010/0153592 A1 Jun. 17, 2010

(51) Int. Cl.
G06F 13/00 (2006.01)
G06F 3/00 (2006.01)
G06F 13/14 (2006.01)
G06F 21/00 (2006.01)
G06F 9/46 (2006.01)
G06F 15/173 (2006.01)
G01R 31/08 (2006.01)

(52) U.S. Cl. ........... 710/36; 710/31; 710/37; 710/38; 710/39; 710/107; 710/305; 370/216; 370/225; 370/229; 711/6; 718/100; 709/239

(58) Field of Classification Search ............ None
See application file for complete search history.

(56) References Cited

U.S. PATENT DOCUMENTS

| | | | |
|---|---|---|---|
| 4,706,081 A | 11/1987 | Hart et al. | |
| 6,108,715 A * | 8/2000 | Leach et al. | 719/330 |
| 6,671,819 B1 * | 12/2003 | Passman et al. | 714/4.1 |
| 7,107,382 B2 * | 9/2006 | Clayton | 710/305 |
| 7,305,591 B2 * | 12/2007 | Do et al. | 714/43 |
| 7,398,337 B2 * | 7/2008 | Arndt et al. | 710/37 |
| 7,464,218 B2 * | 12/2008 | Thiessen et al. | 711/112 |
| 7,478,178 B2 * | 1/2009 | Torudbakken et al. | 710/31 |
| 7,646,708 B2 * | 1/2010 | McGee et al. | 370/229 |
| 8,072,879 B2 * | 12/2011 | Vasseur et al. | 370/225 |
| 2002/0176131 A1 * | 11/2002 | Walters et al. | 359/118 |

(Continued)

FOREIGN PATENT DOCUMENTS

JP 03218543 9/1991

OTHER PUBLICATIONS

"Multi-Root I/O Virtualization and Sharting Revision 0.7," (Jun. 8, 2007). Publisher: PCI-SIG, Published in: US.*

*Primary Examiner* — Chun-Kuan Lee
*Assistant Examiner* — Henry Yu
(74) *Attorney, Agent, or Firm* — Yee & Associates, P.C.

(57) ABSTRACT

In one embodiment, a computer-implemented method for creating redundant system configurations is presented. The computer-implemented method creates a set of virtual function path authorization tables, and receives a request from a requester to provide requested data from a virtual function wherein the virtual function is performed by a single root or a multi-root peripheral component interconnect device. Further a receive buffer is created in a selected address range in a set of addresses ranges as well as a virtual function work queue entry for the virtual function containing an address of the receive buffer in the selected address range. Responsive to a determination that the virtual function is authorized, writing the requested data into the receive buffer of the selected address range in the one or more systems, and responsive to writing the requested data, issuing a notice of completion to the requester.

20 Claims, 13 Drawing Sheets

U.S. PATENT DOCUMENTS

| | | |
|---|---|---|
| 2003/0088698 A1* | 5/2003 | Singh et al. ............... 709/239 |
| 2005/0281191 A1* | 12/2005 | McGee et al. ............. 370/216 |
| 2006/0233137 A1* | 10/2006 | Dantu et al. ............... 370/331 |
| 2007/0177525 A1 | 8/2007 | Wijnands et al. |
| 2007/0186025 A1 | 8/2007 | Boyd et al. |
| 2007/0208898 A1 | 9/2007 | Pettey et al. |
| 2008/0140839 A1 | 6/2008 | Boyd et al. |
| 2008/0148295 A1 | 6/2008 | Freimuth et al. |
| 2008/0313632 A1* | 12/2008 | Kumar et al. ............... 718/100 |
| 2009/0094403 A1* | 4/2009 | Nakagawa et al. ............ 711/6 |

* cited by examiner

USE OF PERIPHERAL COMPONENT INTERCONNECT INPUT/OUTPUT VIRTUALIZATION DEVICES TO CREATE REDUNDANT CONFIGURATIONS

BACKGROUND OF THE INVENTION

1. Field of the Invention

The present invention relates generally to an improved data processing system, and, more specifically, to a computer-implemented method, a data processing system and a computer program product for creating redundant configurations using peripheral component interconnect input/output virtualization configurations.

2. Description of the Related Art

Typical computing devices make use of input/output (I/O) adapters and buses that utilize a version or implementation of the Peripheral Component Interconnect (PCI) standard, originally created by Intel Corporation in the 1990s, and now managed by the PCI-SIG. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

With reference to FIG. 1, an exemplary diagram illustrating a system that incorporates a peripheral component interconnect express (PCIe) bus, in accordance with the peripheral component interconnect express specification is presented. The particular system shown in FIG. 1 is a blade enclosure in which a plurality of server blades 101-104 are provided. A server blade is a self-contained computer server designed for high density systems. Server blades have many components removed for space, power and other considerations while still having all the functionality components to be considered a computer. Blade enclosure 100 provides services, such as power, cooling, networking, various interconnects, and management of various server blades 101-104 in blade enclosure 100. Server blades 101-104 and blade enclosure 100 together form a blade system.

As shown in FIG. 1, peripheral component interconnect express is implemented on each of server blades 101-104 and is used to connect to one of peripheral component interconnect express devices 105-112. Each of these server blades 101-104 is then plugged into a slot in blade enclosure 100 which then connects the outputs of the peripheral component interconnect express Ethernet devices 105, 107, 109, and 111 to Ethernet switch 113, via a backplane in blade enclosure 100, which then generates Ethernet connections 115 for external connectivity, for example, communication connections to devices outside blade enclosure 100. Similarly, each of the peripheral component interconnect express storage devices 106, 108, 110, and 112 are connected via the backplane in blade enclosure 100 to storage area network switch 114 which then generates storage area network connections 116 for external connectivity.

Thus, the system shown in FIG. 1 is exemplary of one type of data processing system in which the peripheral component interconnect and/or peripheral component interconnect express specifications are implemented. Other configurations of data processing systems are known that use the peripheral component interconnect and/or peripheral component interconnect express specifications. These systems are varied in architecture and thus, a detailed treatment of each cannot be made herein. For more information regarding peripheral component interconnect and peripheral component interconnect express, reference is made to the peripheral component interconnect and peripheral component interconnect express specifications available from the peripheral component interconnect special interest group (PCI-SIG) website at www.pcisig.com.

In addition to the peripheral component interconnect and peripheral component interconnect express specifications, the peripheral component interconnect special interest group has also defined input/output virtualization (IOV) standards for defining how to design an input/output adapter (IOA) which can be shared by several logical partitions (LPARs). A logical partition is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine.

In modern systems that support logical partitions, some resources may be shared amongst the logical partitions. As mentioned above, in the peripheral component interconnect and peripheral component interconnect express specification, one such resource that may be shared is the input/output adapter using input/output virtualization mechanisms.

Further, the peripheral component interconnect special interest group has also defined input output virtualization (IOV) standards for sharing input output adapters between multiple systems. This capability is referred to as multi-root (MR) input output virtualization.

With reference to FIG. 2, an exemplary diagram illustrating a system incorporating a peripheral component interconnect express multi-root input output virtualization is presented. In particular, FIG. 2 illustrates how the architecture shown in FIG. 1 can be modified to share the peripheral component interconnect express devices across multiple systems.

Server blades 201-204 now generate peripheral component interconnect express root ports 205-212 and drive peripheral component interconnect express connections across blade enclosure 200 backplane, instead of incorporating the peripheral component interconnect express devices themselves on sever blades 201-204 as was done with server blades 101-104 in FIG. 1. The peripheral component interconnect express links from each server blade 201-204 are then connected to one of multi-root peripheral component interconnect express switches 213-214 which are in turn connected to peripheral component interconnect express Ethernet/storage devices 217-220. Peripheral component interconnect express Ethernet/storage devices 217-220 connect to the external Ethernet and storage devices through external connectivity 215 and 216. Thus, peripheral component interconnect express devices can be used within blade enclosure 200. This reduces overall costs in that the number of peripheral component interconnect express devices 217-220 may be minimized since they are shared across server blades 201-204 through the use of multi-root peripheral component interconnect express switches 221. Moreover, this may reduce the complexity and cost of server blades 201-204 themselves by not requiring integration of peripheral component interconnect express devices 217-220.

While the peripheral component interconnect special interest group provides a standard for defining how to design an input output adapter which can be shared by several logical partitions, the specification does not define how to connect the input output adapters into a host system. Moreover, the standard only specifies how each function can be assigned to a single system.

BRIEF SUMMARY OF THE INVENTION

According to one embodiment of the present invention, a computer-implemented method for creating redundant system configurations is presented. The computer-implemented method creates a set of virtual function path authorization tables, by a trusted entity, wherein entries define access for a function to a set of address ranges in one or more systems and the entries further defining a boundary preventing invalid cross function access, wherein the virtual function is performed by a single root or a multi-root peripheral component interconnect device, receives a request from a requester to provide requested data from the virtual function, creates a receive buffer in a selected address range in the set of address ranges, and creates a virtual function work queue entry for the virtual function containing an address of the receive buffer in the selected address range. Further, the computer-implemented method determines, in the set of virtual function path tables, whether the virtual function is authorized to use the selected address range, responsive to a determination that the virtual function is authorized, writes the requested data into the receive buffer of each address range in the one or more systems, and responsive to writing the requested data, issuing a notice of completion to the requester.

In another embodiment, a data processing system for creating redundant system configurations is presented. The data processing system comprises a bus, a memory connected to the bus, wherein the memory comprises computer-executable instructions, a central processor unit. The central processor unit executes the computer-executable instructions to direct the data processing system to create a set of virtual function path authorization tables, by the trusted entity, wherein entries define access for a function to a set of address ranges in one or more systems and the entries further defining a boundary preventing invalid cross function access, wherein the virtual function is performed by a single root or a multi-root peripheral component interconnect device, receive a request from a requester to provide requested data from the virtual function, create a receive buffer in a selected address range in the set of address ranges, create a virtual function work queue entry for the virtual function containing an address of the receive buffer in the selected address range; determine, in the set of virtual function path tables, whether the virtual function is authorized to use the selected address range, responsive to a determination that the virtual function is authorized, write the requested data into the receive buffer of the selected address range in the one or more systems, and responsive to writing the requested data, issue a notice of completion to the requester.

In another embodiment, a computer program product for creating redundant system configurations is presented. The computer program product comprises a computer-readable medium having computer-executable instructions stored thereon. The computer-executable instructions comprise computer-executable instructions for creating a set of virtual function path authorization tables, by a trusted entity, wherein entries define access for a virtual function to a set of address ranges in one or more systems and the entries further defining a boundary preventing invalid cross function access, wherein the virtual function is performed by a single root or a multi-root peripheral component interconnect device, computer-executable instructions for receiving a request from a requester to provide requested data from the virtual function, and computer-executable instructions for creating a receive buffer in a selected address range in the set of address ranges. The computer-executable instructions further comprise computer-executable instructions for creating a virtual function work queue entry for the virtual function containing an address of the receive buffer in the selected address range, computer-executable instructions for determining, in the set of virtual function path tables, whether the virtual function is authorized to use the selected address range, computer-executable instructions responsive to a determination that the virtual function is authorized, for writing the requested data into the receive buffer of the selected address range in the one or more systems, and computer-executable instructions responsive to writing the requested data, for issuing a notice of completion to the requester.

DETAILED DESCRIPTION OF THE INVENTION

Figure 1:
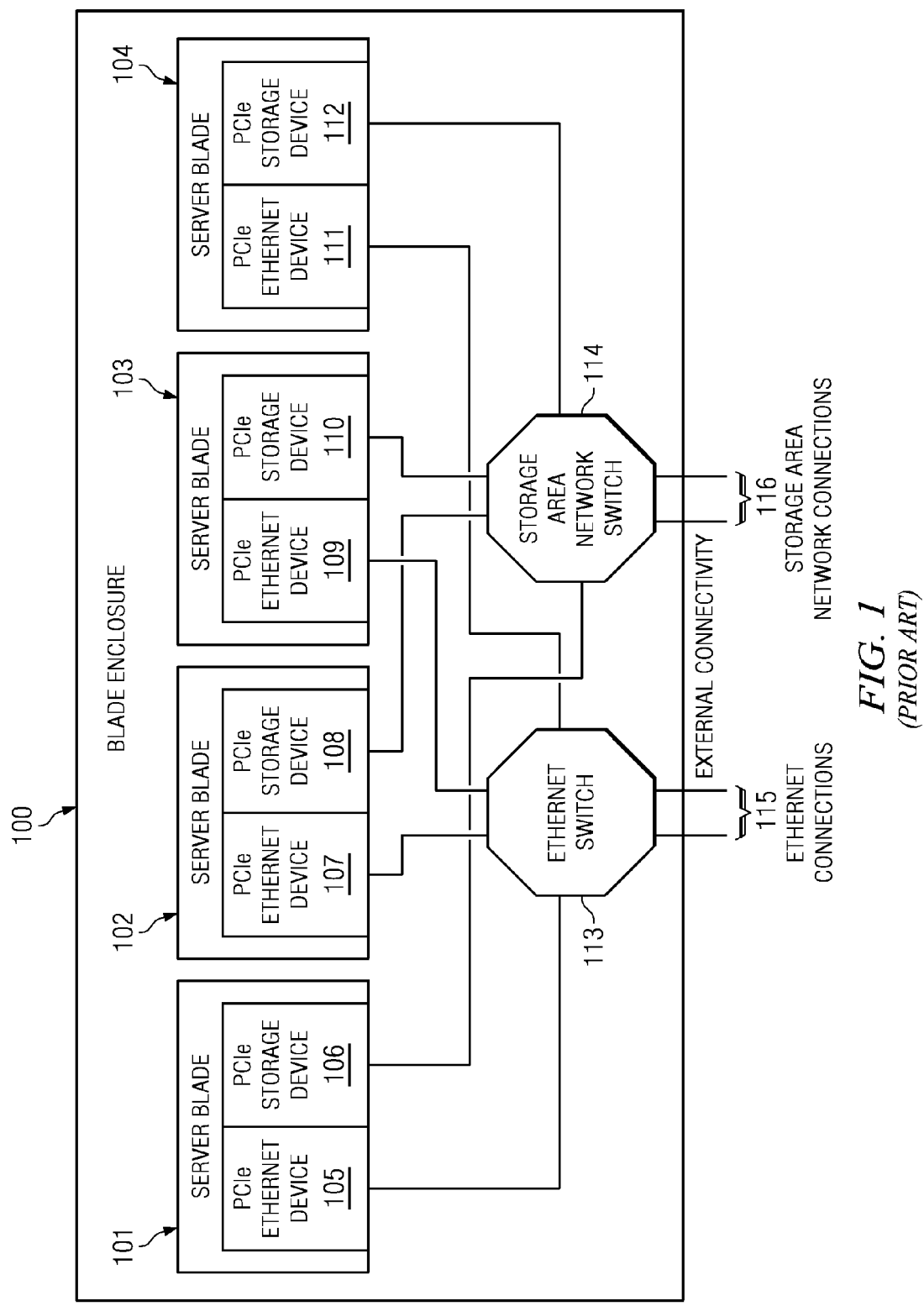
FIG. 1 is a block diagram of a system architecture implementing a peripheral component interconnect express standard.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer, or other programmable apparatus to produce a computer-implemented process such that the instructions which execute on the computer or other programmable apparatus, provide processes for implementing the functions/acts specified in the flowchart and/or block diagram block or blocks.

Illustrative embodiments provide mechanisms for configuration of a multi-root input/output virtualization (MR-IOV) adapter and input/output fabric to allow for multiple paths from an input/output virtualization function to separate systems. While illustrative embodiments will be described with regard to peripheral component interconnect express (PCIe) adapters or endpoints, the present invention is not limited to such. Rather, the mechanisms of the illustrative embodiments may be implemented in any input/output fabric that supports input/output virtualization within the input/output adapters.

Moreover, while illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 2:
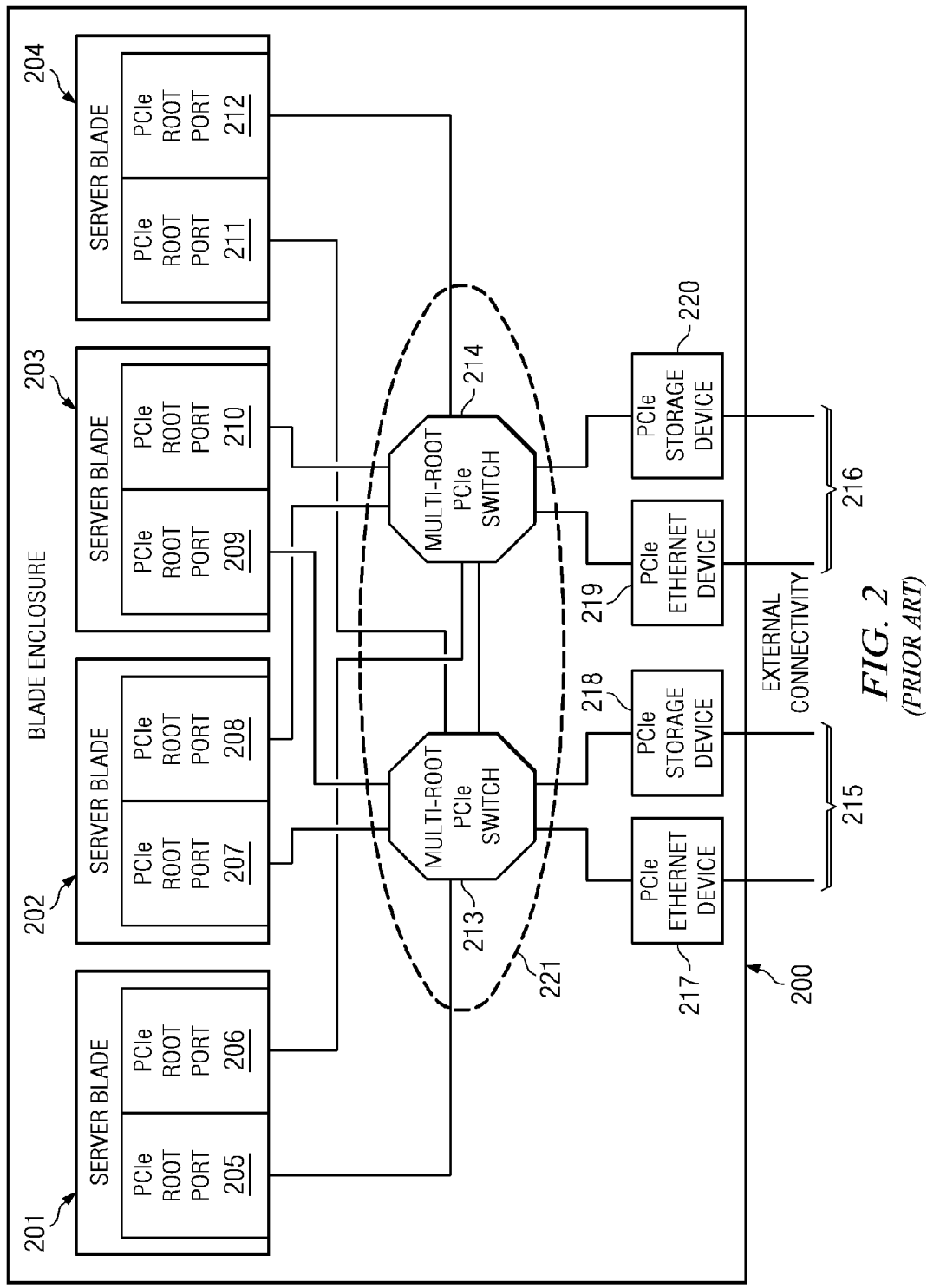
FIG. 2 is a block diagram of the system of FIG. 1 incorporating peripheral component interconnect multi-root input output virtualization.
Figure 3:
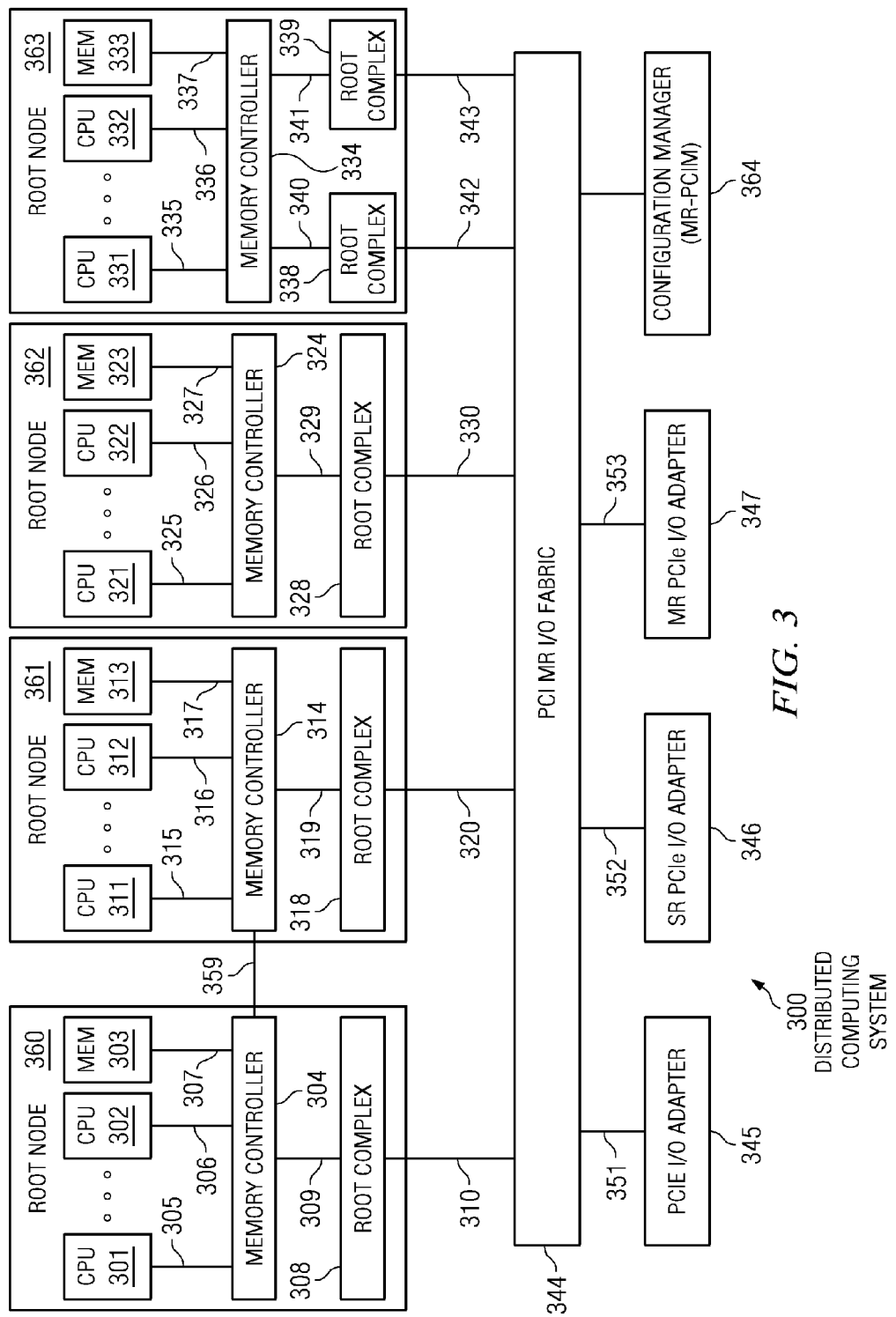
FIG. 3 is a block diagram of a distributed computing system utilizing a peripheral component interconnect multi-root input output fabric.

With reference now to the figures, and in particular with reference to FIG. 3, a block diagram of a distributed computing system utilizing a peripheral component interconnect multi-root input output fabric is illustrated in accordance with an illustrative embodiment of the present invention. FIG. 3 enhances the configurations of FIG. 1 and FIG. 2 with the addition of peripheral component interconnect fabric to connect system nodes with shared input/output adapters. As shown in FIG. 3, distributed computer system 300 comprises plurality of root nodes 360-363 coupled to peripheral component interconnect multi-root input output fabric 344 which in turn is coupled to multi-root input output fabric configuration manager 364 and peripheral component interconnect output adapters or endpoints 345-347. Each root node 360-363 comprises one or more corresponding root complexes 308, 318, 328, 338, and 339, attached to peripheral component interconnect multi-root input/output fabric 344 through input/output links 310, 320, 330, 342, and 343, respectively, and further attached to memory controllers 304, 314, 324, and 334 of root nodes (RNs) 360-363. Input/output fabric 344 is attached to input output adapters 345, 346, and 347 through links 351, 352, and 353. Input output adapters 345, 346, and 347 may be non-input/output virtualization enabled adapters such as in peripheral component interconnect express input/output adapter 345, single-root (SR) input output virtualization adapters such as in peripheral component interconnect express input/output adapter 346, or multiple-root input output virtualization adapters such as in peripheral component interconnect express input/output adapter 347.

As shown, root complexes 308, 318, 328, 338, and 339 are part of root nodes 360, 361, 362, and 363. More than one root complex per root node may be present, such as is shown in root node 363. A root complex is the root of an input/output hierarchy that connects the central processor/memory to the input/output adapters. The root complex includes a host bridge, zero or more root complex integrated endpoints, zero or more root complex event collectors, and one or more root ports. Each root port supports a separate input/output hierarchy. The input/output hierarchies may be comprised of a root complex, for example, root complex 308, zero or more interconnect switches and/or bridges (which comprise a switch or peripheral component interconnect express fabric, such as peripheral component interconnect multi-root input output fabric 344), and one or more endpoints, such as peripheral component interconnect express input/output adapters or endpoints 345-347.

In addition to the root complexes, each root node consists of one or more central processing units 301, 302, 311, 312, 321, 322, 331, and 332, memory 303, 313, 323, and 333, memory controller 304, 314, 324, and 334. Memory controller 304, 314, 324, and 334 connects central processing units 301, 302, 311, 312, 321, 322, 331, and 332, with memory 303, 313, 323, and 333, by way of buses 305, 306, 307, 315, 316, 317, 325, 326, 327, 335, 336 and 337 and input/output root complexes 308, 318, 328, 338, and 339 by buses 309, 319, 329, 340 and 341. Memory controllers typically perform functions such as handling coherency traffic for the memory. Root nodes 360 and 361 may be connected together at connection 359 through their memory controllers 304 and 314 to form one coherency domain. Thus, root nodes 360-361 may act as a single symmetric multi-processing (SMP) system, or may be independent nodes with separate coherency domains as in root nodes 362 and 363.

The multi-root input output fabric configuration manager 364 may be isolated from the other operations of the root nodes, and is therefore shown as attached separately to input/output fabric 344. However, this adds expense to the system, and therefore the embodiments as disclosed herein may include this functionality as part of one or more of the root nodes 360, 361, 362, and 363. Configuration manager 364 configures the shared resources of the multi-root input output fabric 344 and assigns resources to root nodes 360, 361, 362, and 363.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Using the example of distributed computing system 300 of FIG. 3, illustrative embodiments provide a capability for a single function of an input/output virtualization device to gain access to multiple systems. The capability enables configuring, by configuration manager 364, an input/output subsystem with redundant paths, allowing the single function of an input/output virtualization device to access multiple systems through multiple communications paths between the multiple systems.

Illustrative embodiments address the situation where input/output (I/O) fabric 344 is shared by more than one system such as systems of root nodes 360, 361, 362 and 363 or logical partition (LPAR), where each system or logical partition can potentially share with the other logical partition an input/output adapter (IOA) such as peripheral component interconnect express input/output adapters or endpoints 345-347, and where multiple systems can share an input/output adapter by use of an multi-root input/output virtualization fabric. The illustrative embodiments define a mechanism for a single function of an input/output virtualization adapter, such as peripheral component interconnect express input/output adapter 347, to be authorized to access multiple systems or logical partitions of the root nodes while also preventing access to systems to which it should not be allowed to access. A single input/output virtualization function is thus allowed to access multiple virtual hierarchies (VHs), or paths, and virtual functions of multi-root input/output fabric 344 for the purpose of establishing redundant paths between endpoints 345-347 and memory 303, 313, 323 and 333 of the multiple root nodes.

Figure 4:
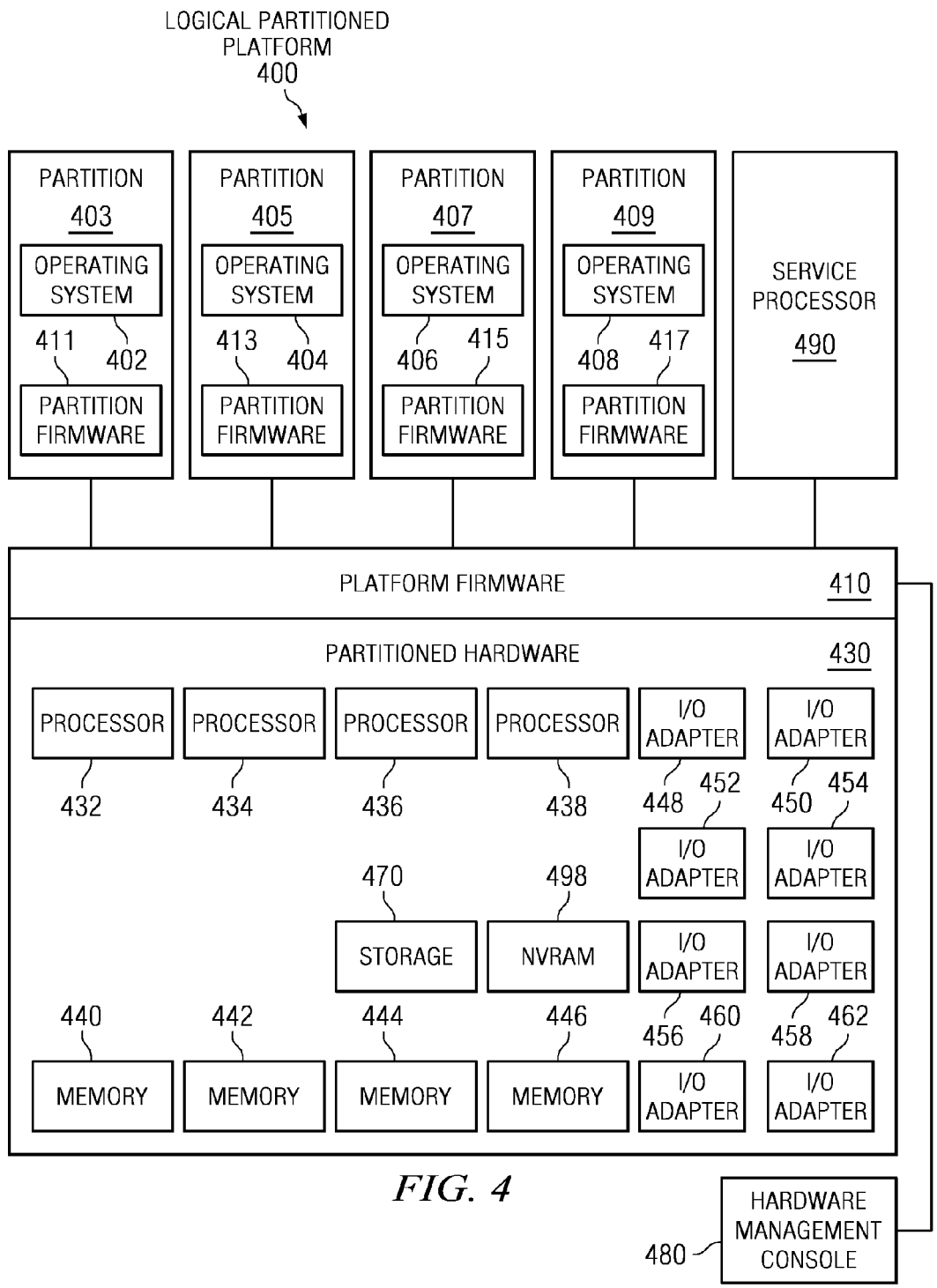
FIG. 4 is a block diagram of the virtualization of system resources using multiple logical partitions in which illustrative embodiments of the present invention may be implemented.

With reference now to FIG. 4, a block diagram of the virtualization of system resources using multiple logical partitions in which illustrative embodiments of the present invention may be implemented, is presented. The hardware in logical partitioned platform 400 may be implemented, for example, within root nodes 360, 361, 362, 363 in FIG. 3, and may further include portions of multi-root input output fabric 344 and input/output adapters 345-347 which are assigned to the root node.

Logical partitioned platform 400 includes partitioned hardware 430, operating systems 402, 404, 406, and 408, and partition management of platform firmware 410. Operating systems 402, 404, 406, and 408 may be multiple copies of a single operating system or multiple heterogeneous operating systems simultaneously run on logical partitioned platform 400.

Operating systems 402, 404, 406, and 408 are located in partitions 403, 405, 407, and 409. Hypervisor software, or firmware, is an example of software that may be used to implement partition management of platform firmware 410. Firmware is "software" stored in a memory chip that holds its content without electrical power, such as, for example, in a read-only memory (ROM), programmable read-only memory (PROM), erasable programmable read-only memory (EPROM), electrically erasable programmable read-only memory (EEPROM), and nonvolatile random access memory (NVRAM).

Additionally, partitions 403, 405, 407, and 409 also include partition firmware 411, 413, 415, and 417. Partition firmware 411, 413, 415, and 417 may be implemented using initial boot strap code, for example Institute of Electrical and Electronics Engineers, Inc (IEEE) 1275 Standard Open Firmware, and runtime abstraction software (RTAS). When partitions 403, 405, 407, and 409 are instantiated, a copy of boot strap code is loaded onto partitions 403, 405, 407, and 409 by platform firmware 410. Thereafter, control is transferred to the boot strap code with the boot strap code then loading the open firmware and runtime abstraction software. The processors associated or assigned to partitions 403, 405, 407, and 409 are then dispatched to the partition's memory to execute partition firmware 411, 413, 415, and 417.

Partitioned hardware 430 includes plurality of processors 432, 434, 436, and 438, a plurality of system memory units 440, 442, 444, and 446, plurality of input output adapters 448, 450, 452, 454, 456, 458, 460, and 462, storage unit 470, and non-volatile random access memory storage 498. Each of processors 432, 434, 436, and 438, memory units 440, 442, 444, and 446, non-volatile random access memory storage 498, and input output adapters 448, 450, 452, 454, 456, 458, 460, and 462, or parts thereof, may be assigned to one of multiple partitions within logical partitioned platform 400, each of which corresponds to one of operating systems 402, 404, 406, and 408.

Platform firmware 410 performs a number of functions and services for partitions 403, 405, 407, and 409 to create and enforce the partitioning of logical partitioned platform 400. Platform firmware 410 may include partition management firmware which may include a firmware implemented virtual machine identical to the underlying hardware. Thus, partition management firmware in platform firmware 410 allows the simultaneous execution of independent operating system images 402, 404, 406, and 408 by virtualizing the hardware resources of logical partitioned platform 400.

Service processor 490 may be used to provide various services, such as processing of platform errors in partitions 403, 405, 407, and 409. These services also may act as a service agent to report errors back to a vendor. Operations of partitions 403, 405, 407, and 409 may be controlled through a hardware management console, such as hardware management console 480. Hardware management console 480 is a separate distributed computing system from which a system administrator may perform various functions, including reallocation of resources to different partitions. Operations which may be controlled include things like the configuration of the partition relative to the components which are assigned to the partition, whether the partition is running or not.

In a logical partitioning (LPAR) environment, it is not permissible for resources or programs in one partition to affect operations in another partition. Furthermore, to be useful, the assignment of resources needs to be fine-grained. For example, it is often not acceptable to assign all input output adapters under a particular peripheral component interconnect host bridge (PHB) to the same partition, as that will restrict configurability of the system, including the ability to dynamically move resources between partitions.

Accordingly, some functionality is needed in the bridges that connect input/output adapters to the input/output bus so as to be able to assign resources, such as individual input/output adapters or parts of input/output adapters to separate partitions; and, at the same time, prevent the assigned resources from affecting other partitions such as by obtaining access to resources of the other partitions.

Figure 5A:
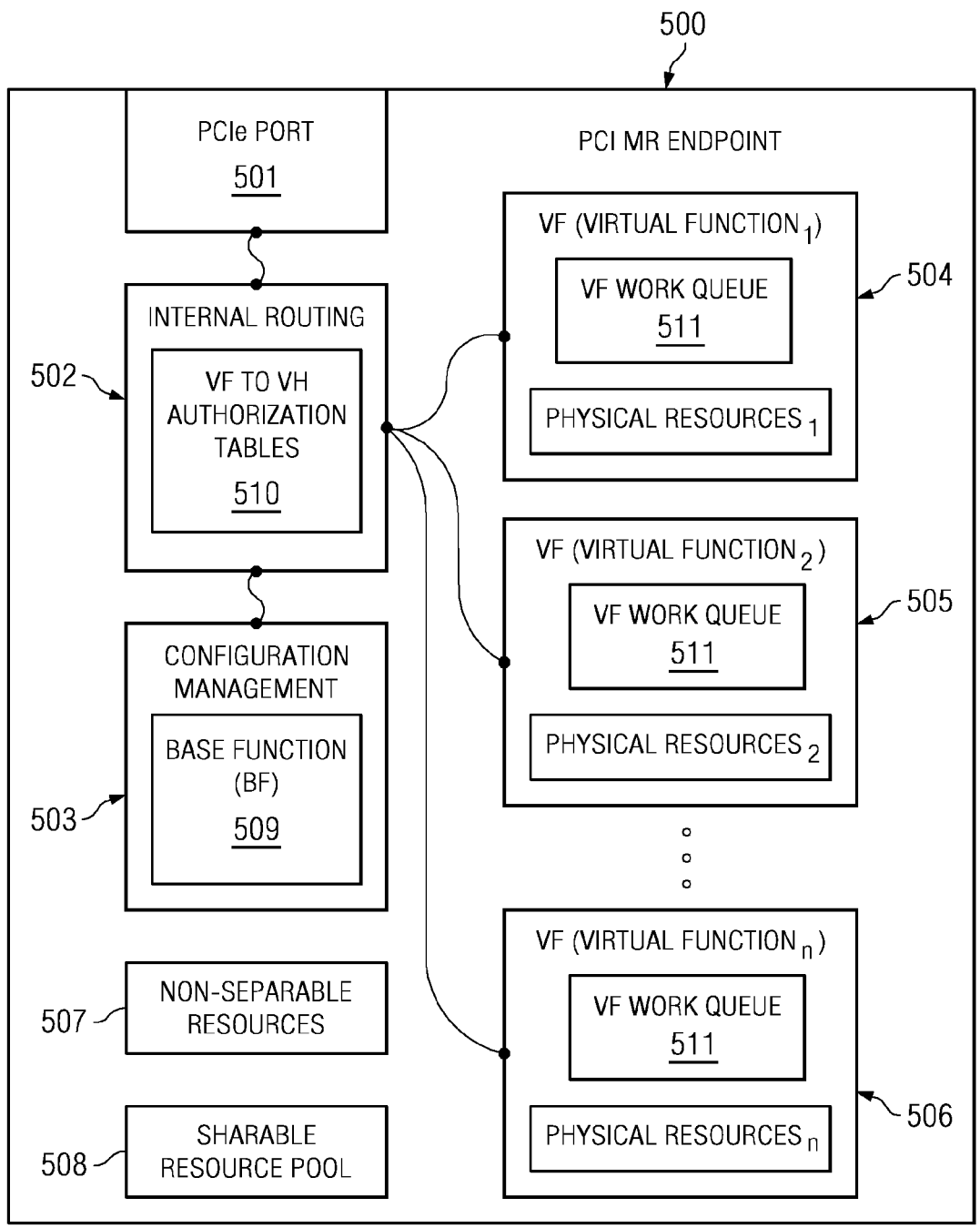
FIG. 5A is a block diagram of a peripheral component interconnect express multi-root input output virtualization enabled endpoint, in accordance with an illustrative embodiment.

With reference to FIG. 5A, a block diagram of a peripheral component interconnect express multi-root input output virtualization enabled endpoint is presented. As shown in FIG. 5A, peripheral component interconnect express multi-root input output virtualization endpoint 500, such as multi-root peripheral component interconnect express input/output adapter 347 of FIG. 3, includes peripheral component interconnect express port 501 through which communications with peripheral component interconnect express switches, and the like, of a peripheral component interconnect express fabric may be performed. Internal routing 502 provides communication pathways to configuration management function 503 and configuration management function 509 and a plurality of virtual functions (VFs) 504-506. Configuration management function 503 may be a physical function (PF) as opposed to virtual functions 504-506 and configuration management function 509 may be a base function (BF) 509. A physical "function," as the term is used in the peripheral component interconnect specifications, is a set of logic that is represented by a single configuration space. In other words, a physical "function" is circuit logic that is configurable based on data stored in the function's associated configuration space in a memory, such as may be provided in non-separable resources 507, for example. A similar statement can be made for base "function" 509.

Configuration management function 503 may be used to configure virtual functions 504-506. The virtual functions are functions, within an input/output virtualization enabled endpoint, that share one or more physical endpoint resources; for example, a link, and which may be provided in sharable resource pool 508 of peripheral component interconnect express input/output virtualization endpoint 500, for example, with another function. The virtual functions can, without run-time intervention by a hypervisor, directly be a sink for input/output and memory operations from a system image, and be a source of direct memory access (DMA), completion, and interrupt operations to a system image.

Multi-root input output virtualization endpoint 500 can also be shared between multiple root nodes, for example root nodes 360-363 in FIG. 3. Configuration management function, 509, as a base function, may be used to configure characteristics of the physical functions, for example, which root node has access to each physical function.

Peripheral component interconnect express endpoints may have many different types of configurations with regard to the "functions" supported by the peripheral component interconnect express endpoints. For example, endpoints may support a single physical function, multiple independent physical functions, or even multiple dependent physical functions. In endpoints that support native input/output virtualization, each physical function supported by the endpoints may be associated with one or more virtual functions, which themselves may be dependent upon virtual functions associated with other physical functions. The unit of the input output virtualization endpoint which is assigned to a root node is the physical function, and multi-root input output virtualization enabled endpoints will contain multiple physical functions.

In one embodiment, virtual function (VF) to virtual hierarchy (VH) authorization tables 510 allow configuration manager 364 of FIG. 3 to give each function access to multiple virtual hierarchies. This aspect will be described later. Virtual function work queues 511, also to be described further, are setup by the device driver software for the virtual function and specify the operations to be performed by the virtual function. The virtual function work queue entries in the table will also include the virtual hierarchy number or numbers to use for the particular operation being requested.

Figure 5B:
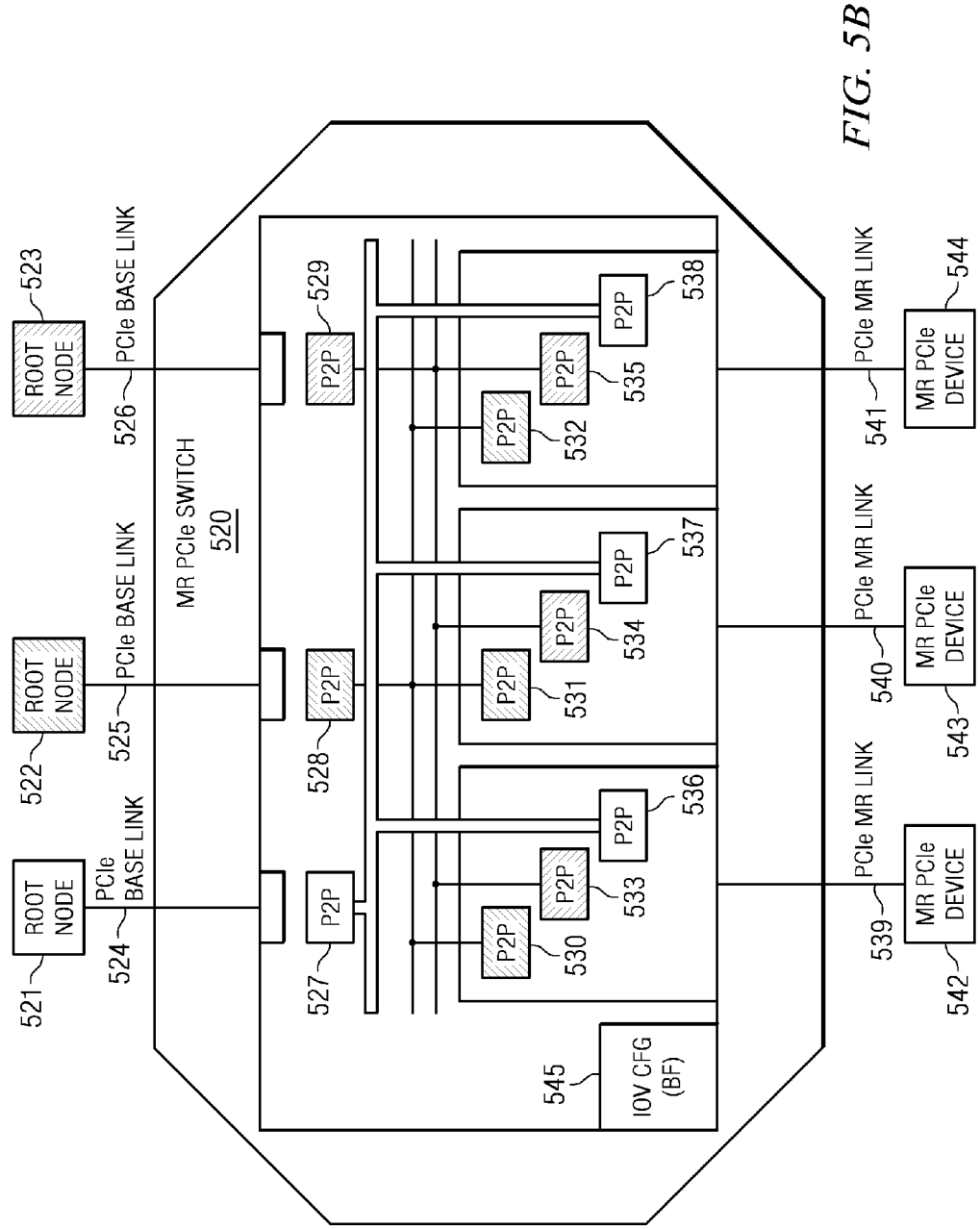
FIG. 5B is a block diagram of a peripheral component interconnect express multi-root enabled peripheral component interconnect express switch.

With reference to FIG. 5B, a block diagram of a peripheral component interconnect express multi-root enabled peripheral component interconnect express switch, is presented. Peripheral component interconnect express switch 520 might be used, for example in peripheral component interconnect multi-root input/output fabric 344 in FIG. 3, as defined by the peripheral component interconnect multi-root input/output virtualization specification. Switch 520 logically consists of multiple virtual planes, one per port that is connected to a root node. For example, root node 521 connects, by peripheral component interconnect express link 524, to the logical peripheral component interconnect to peripheral component interconnect (P2P) bridge 527 which is logically connected internally to the switch to peripheral component interconnect to peripheral component interconnects 536-538. Similarly, root node 522 connects, by peripheral component interconnect express link 525, to the logical peripheral component interconnect to peripheral component interconnect bridge 528 which is logically connected internally to the switch to peripheral component interconnect to peripheral component interconnect 530-532, and root node 523 connects, by peripheral component interconnect express link 526, to the logical peripheral component interconnect to peripheral component interconnect bridge 529 which is logically connected internally to the switch to peripheral component interconnect to peripheral component interconnect 533-535.

Peripheral component interconnect to peripheral component interconnect bridges 530, 533, and 536 then share peripheral component interconnect express multi-root link 539 so that they can share the resources of multi-root peripheral component interconnect express device 542. In a similar manner, peripheral component interconnect to peripheral component interconnect bridges 531, 534, and 537 then share peripheral component interconnect express multi-root link 540 so that they can share the resources of peripheral component interconnect express multi-root device 543, and peripheral component interconnect to peripheral component interconnect bridges 532, 535, and 538 then share peripheral component interconnect express multi-root link 541 so that they can share the resources of multi-root peripheral component interconnect express device 544.

The control point for setting up switch 520 is base function (BF) 545. This input/output virtualization configuration mechanism, for example, base function 545, allows a multi-root peripheral component interconnect manager (MR-PCIM) program to determine the logical structure within switch 520. For example, FIG. 5B shows a fairly symmetric configuration, with each root node 521-523 having access to part of each peripheral component interconnect express multi-root device 542-544. In normal systems, the system administrator may want to setup the input/output in a less symmetric way, in order to meet the needs of the users using the system.

Base functions 545 and 509 are accessed by a multi-root peripheral component interconnect manager program. Where this program resides is not specified by the peripheral component interconnect special interest group input/output virtualization specifications. The program could reside, for example, in a node that is dedicated solely to a multi-root peripheral component interconnect manager and is attached to one of the root port nodes, as is shown by one of root nodes 521-523, or may be provided via a vendor-unique port with a separate processor attached, for example, a service processor as in 490 in FIG. 4. Regardless of where the multi-root peripheral component interconnect manager is executed, the main requirement is that this program be robust and cannot be affected by the operations, or failure thereof, of other applications in the system.

Illustrative embodiments provide a mechanism for configuration of an input/output virtualization adapter, such as input/output virtualization enabled peripheral component interconnect express endpoint 500 shown in FIG. 5A, to access more than one system. The mechanisms of the illustrative embodiments address the situation where an input/output fabric, which may comprise one or more peripheral component interconnect express switches such as peripheral component interconnect express switch 520 in FIG. 5B, is shared by more than one system, for example root nodes 362 and 363 of FIG. 3.

Figure 6A:
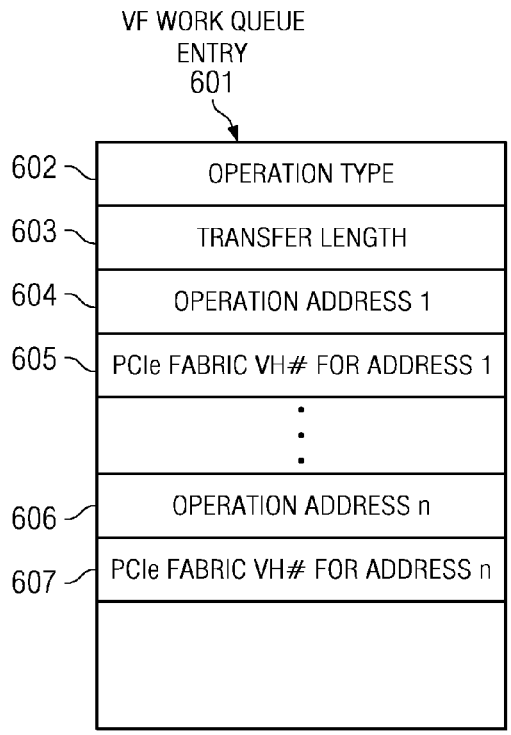
FIG. 6A is a block diagram of a virtual function work queue entry, in accordance with an illustrative embodiment.

With reference now to FIG. 6A, a block diagram of a virtual function (VF) work queue entry, in accordance with an illustrative embodiment, is presented. The example provided is representative of virtual function work queue entry 511 in FIG. 5. Fields 605 and 607 of virtual function work queue entry 601 contain the peripheral component interconnect express fabric virtual hierarchy numbers. Fields 605 and 607 indicate to the virtual function which system to send to or from which system to receive the direct memory access data for the operation. The fields allow the device driver software to send the same data to multiple systems. For example, on a network adapter a packet received from a virtual function network connection may be written to the system memory of multiple systems. For example, to system memory 323 and 333 in systems 362 and 363 in FIG. 3, in order to maintain a copy of the data if a system fails before data is committed to a non-volatile storage media such as a disk. By having redundancy a system can signal that the data has been committed to disk, for example, before the data is actually written to the disk, because the data is safe in a redundant system. Signaling a completion of the write operation before the data is written physically to disk provides a faster response, less latency, to the requester of the disk write operation.

Other fields of virtual function work queue entry 601 include operation type 602, transfer length 603, and operation addresses 604, 606. Operation type 602 indicates what operation to perform to the virtual function. For example, for a network adapter, the operation may be to set up receive buffers. In this case, the receive buffer may be setup in more than one system using more than one operation address and peripheral component interconnect express fabric virtual hierarchy number pair of fields, one pair for each system. There is one pair of these fields, for example 604 and 605, 606 and 607, for each system for which to send the received data. Transfer length 603, in this case, would be set to the buffer length.

Those skilled in the art will recognize that the types of operations and the field types may vary by the functionality to be provided by the adapter. The peripheral component interconnect express fabric virtual hierarchy number is provided for each address, in order to direct the data to the correct system.

Figure 6B:
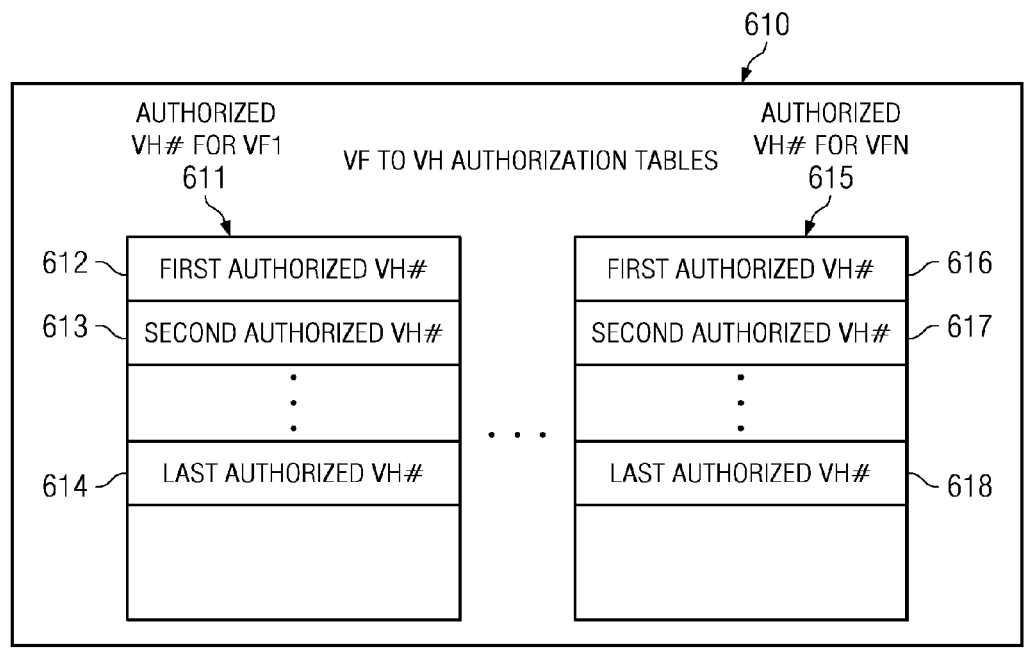
FIG. 6B is a block diagram of tables for validating the authority of a virtual function to access any given virtual hierarchy in a multi-root device, in accordance with an illustrative embodiment.

With reference to FIG. 6B, a block diagram of tables for validating the authority of a virtual function to access any given virtual hierarchy in a multi-root device, in accordance with an illustrative embodiment, is presented. Virtual function to virtual hierarchy authorization tables 610 is an example of virtual function to virtual hierarchy authorization tables 510 of FIG. 5A. In a multi-root device the adapter provides the equivalent of a firewall between functions that can be accessed by different systems. Peripheral component interconnect express fabric virtual hierarchy number fields 605, and 607, in FIG. 6A, provide a mechanism for tunneling through a firewall to use the virtual hierarchy number that would normally be assigned to a different function controlled by a different system. Since peripheral component interconnect express fabric virtual hierarchy number fields field 605 and 607 in FIG. 6A are setup by device driver software in one system, it is important that the virtual hierarchy number used is validated, so that a system can set up an associated virtual function to only tunnel through allowed firewalls on the adapter. The required functionality is provided through virtual function to virtual hierarchy authorization tables 610. There is a virtual function number to virtual hierarchy authorization table 611 and 615, for each virtual function in the adapter. In the example, the table may include multiple entries 612-614, 616-618, one entry for each virtual hierarchy that the virtual function, to which the table applies, is allowed to access. Prior to allowing a virtual function to process a virtual function work queue entry 601, peripheral component interconnect express fabric virtual hierarchy number fields 605, 607 are checked against the appropriate virtual function to virtual hierarchy authorization table to make sure that the virtual function has authority to access the virtual hierarchy number. If not authorized, the processing of virtual function work queue entry 601 is not allowed, and an error is signaled to the device driver software. Virtual function to virtual hierarchy authorization tables 610 are setup by trusted software. For example the trusted software may be a multi-root input/output fabric configuration manager or multi-root peripheral component interconnect manager 364 in FIG. 3. The table cannot be changed by the device driver software in the systems, thus making the control of the tunneling process secure. Further explanation of the use of these tables will be described later.

Figure 6C:
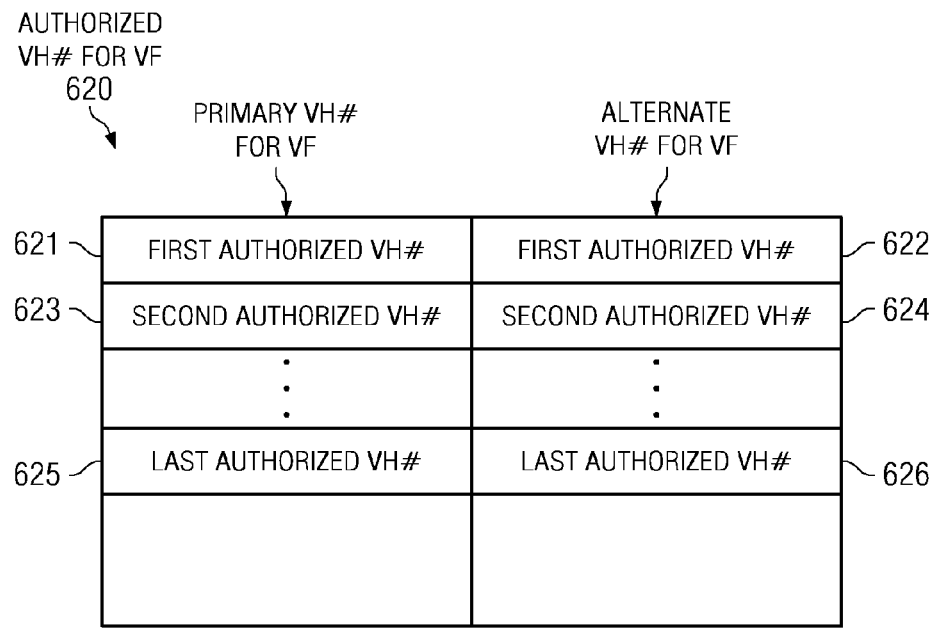
FIG. 6C is a block diagram of a table for specifying an alternate route virtual hierarchy for redundant path implementations of a multi-root device, in accordance with an illustrative embodiment.

With reference to FIG. 6C, a block diagram of a table for specifying an alternate route virtual hierarchy for redundant path implementations of a multi-root device, in accordance with an illustrative embodiment, is presented. Authorized virtual hierarchy number for virtual function tables 620 a correspondence between primary and secondary path entries maintained in internal routing 502 of FIG. 5A. If one of the paths specified by the virtual hierarchy number in virtual function to virtual hierarchy authorization tables 610 becomes unavailable, a redundant and robust configuration provides a capability to use an alternate path to the desired system for the operation. Expanded authorized virtual hierarchy number for virtual function tables 620 can be used instead of virtual function to virtual hierarchy authorization tables 610, in this case. The difference in authorized virtual hierarchy number for virtual function tables 620 is that for each entry 621-625, there is an alternate entry 622-626 specifying an alternate virtual hierarchy number to use in place of the virtual hierarchy number that is non-operational. For example, if entry 621 specifies virtual hierarchy number "1" and entry 622 specifies virtual hierarchy number "3," when virtual function work queue entry 601 specifies virtual hierarchy number "1" and virtual hierarchy number "1" is detected as non-operational, then virtual hierarchy number "3" can be used to access the same system memory in the same system as would have been available with virtual hierarchy number "1". Thus, not only is there a way to avoid entire system failures, for example, by sending the same data to multiple systems for the same operation, but there is also a way to avoid input/output fabric failures through redundancy. The virtual hierarchy number may be used as a path identifier.

Figure 6D:
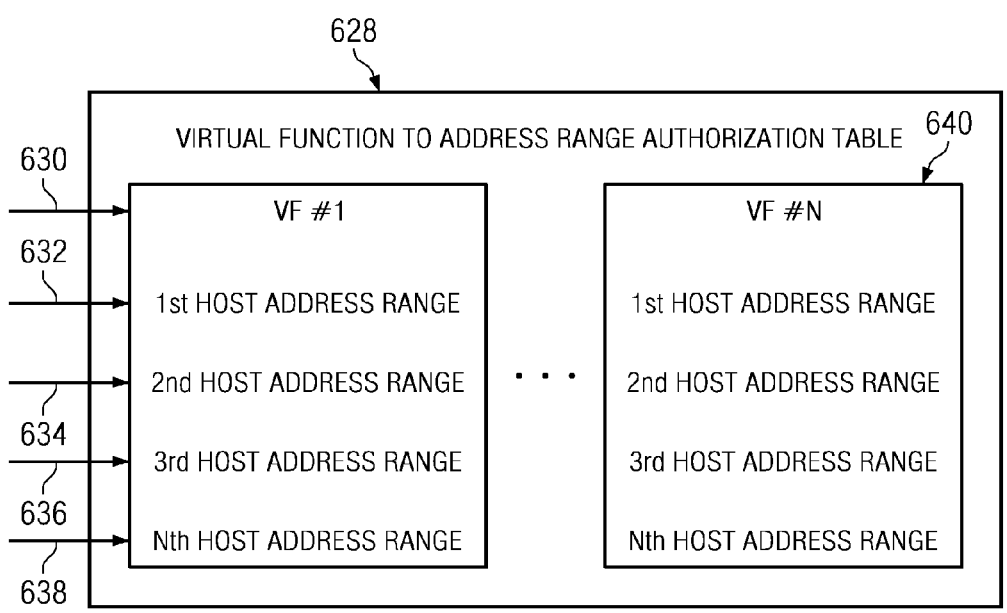
FIG. 6D is a block diagram of a table for specifying an authorized address to virtual function relationship, in accordance with an illustrative embodiment.

With reference to FIG. 6D, a block diagram of a table for specifying an authorized address to virtual function relationship, in accordance with an illustrative embodiment, is presented. Virtual function to address authorization table 628 contains a table for each virtual function requiring authorization. For each function, a set of permitted addresses is provided, with entries in the table 630, 640 representing a range of addresses that the associated virtual function is allowed to access. In the example, the table for the first virtual function 630 has a set of entries associated. Addresses that the first virtual function 630 is permitted to use are listed as authorized addresses 632-638. In a similar manner a last virtual function "VFn" has a set of entries depicted by table entry 640. The function of virtual function to address authorization tables 628 is similar to that of virtual function to virtual hierarchy authorization tables 610 of FIG. 6B in permitting access by a virtual function to resources, for example address ranges in different logical partitions of the same root node. Virtual function to address authorization table 628 provides a capability similar to virtual function to virtual hierarchy authorization table 610, with addresses rather than virtual hierarchies being used.

Figure 6E:
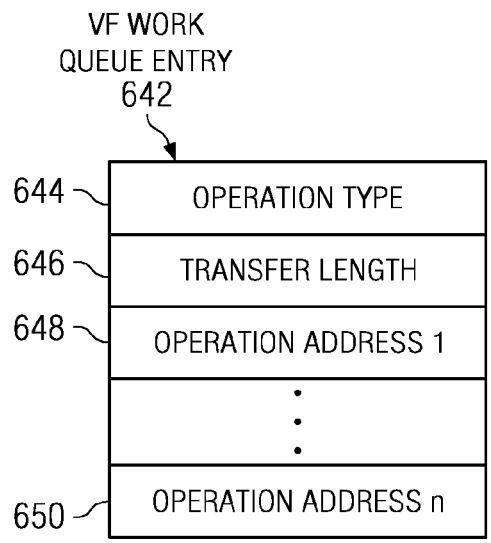
FIG. 6E is a block diagram of a virtual function work queue entry using an address of FIG. 6D, in accordance with an illustrative embodiment.

With reference to FIG. 6E, a block diagram of a virtual function (VF) work queue entry using an address of FIG. 6D, in accordance with an illustrative embodiment, is presented. The example provided is representative of virtual function work queue entry 601 in FIG. 6A, as a further example of virtual function work queues 511 of FIG. 5. In this example, virtual function work queue entry 642 contains a number of fields including operation type 644, and transfer length 646 as before. A difference from the prior virtual function work queue entry of FIG. 6A is that there are no virtual hierarchy numbers. In place of the virtual hierarchy numbers are found operation address 648 through operation address 650. The operation address specifies a location associated with the data, for example, addresses within different logical partitions of the same root node.

Figure 7:
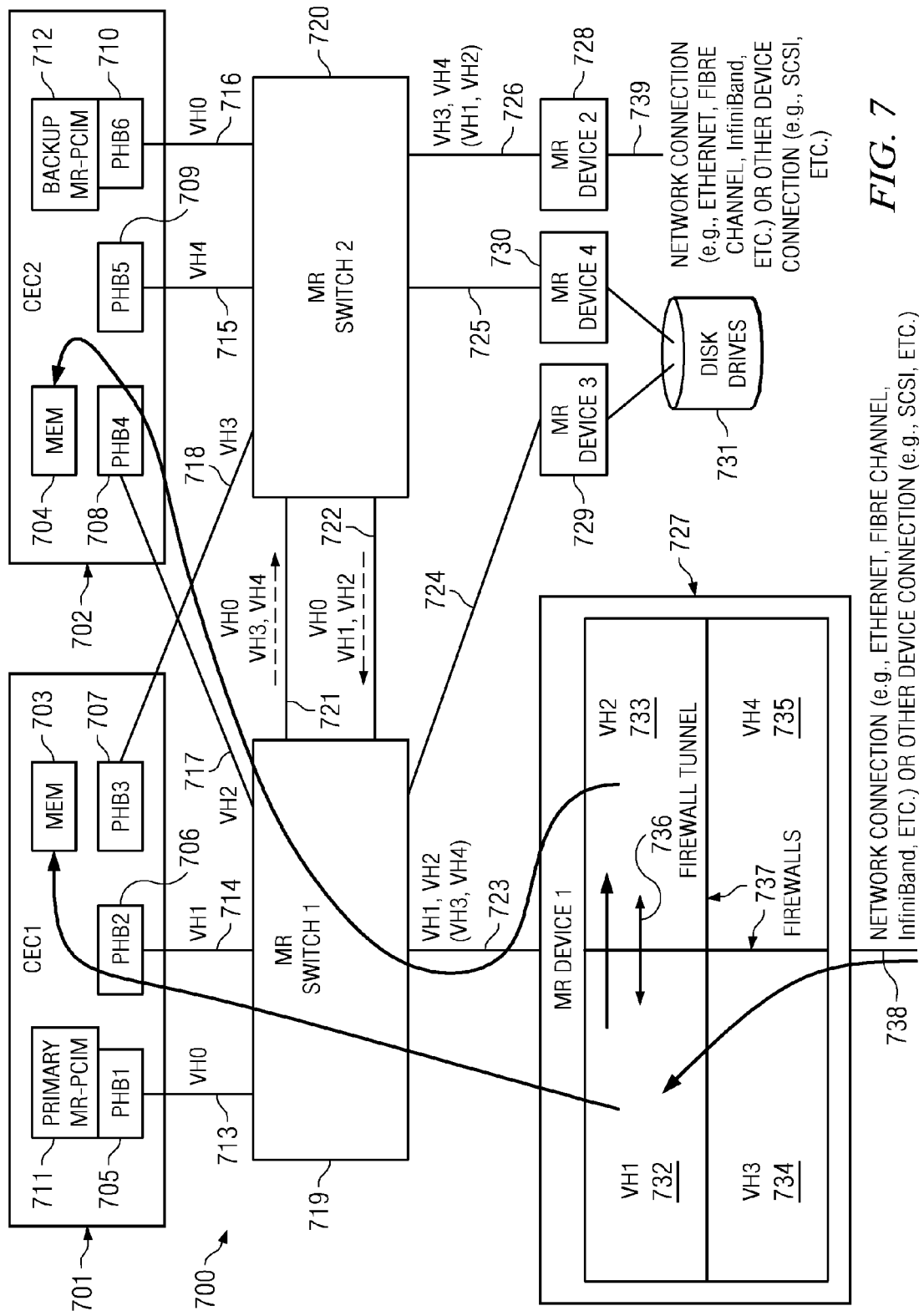
FIG. 7 is a block diagram of a configuration of redundant systems using multi-root devices and multi-root switches, in accordance with an illustrative embodiment.

With reference to FIG. 7, a block diagram of a configuration of redundant systems using multi-root devices and multi-root switches, in accordance with an illustrative embodiment, is presented. Using the example of distributed computing system 300 of FIG. 3, a configuration of systems 700 using multi-root devices and multi-root switches connected using computer electronic complex (CEC) to computer electronic complex communication devices such as multi-root device 1 727 and multi-root device 2 728, is defined.

Two computer systems are shown, comprising computer electronic complex 1 701 and computer electronic complex 2 702, but those skilled in the art will recognize that more than a two-way redundant system could be constructed. The computer electronic complexes correspond to the root nodes in FIG. 3 with the peripheral component interconnect host bridges (PHB) corresponding to the root complexes of FIG. 3.

The two computer electronic complexes may also be partitioned as in FIG. 4 to form sets of logical partitions. The two computer electronic complexes consist of system memory 703, 704, and three peripheral component interconnect host bridges each, 705-707 and 708-710. Multi-root peripheral component interconnect manager 711 corresponds to the configuration manager 364 in FIG. 3. This being a highly redundant system, there also is a backup multi-root peripheral component interconnect manager 712 which can take over for the primary multi-root peripheral component interconnect manager 711 in case of the failure of the primary multi-root peripheral component interconnect manager 711, failure of computer electronic complex 1, failure of peripheral component interconnect host bridge 1 (PHB1) 705, or any other failure that prevents multi-root peripheral component interconnect manager 711 from controlling the multi-root input/output fabric operations. The multi-root peripheral component interconnect manager fail-over process is beyond the scope of this invention.

The multi-root peripheral component interconnect managers 711 and 712 are connected to virtual hierarchy 0 of the multi-root fabric, which is defined by the peripheral component interconnect express multi-root input/output virtualization specification as being the management virtual hierarchy, though peripheral component interconnect host bridge 1 (PHB1) 705 and peripheral component interconnect express link 713 to multi-root switch 1 719 and through peripheral component interconnect host bridge 6 (PHB6) 710 and peripheral component interconnect express link 716 to multi-root switch 2 720. The other peripheral component interconnect host bridges form a primary virtual hierarchy connection and secondary virtual hierarchy connection to the multi-root fabric. Specifically, computer electronic complex 1 primary virtual hierarchy is virtual hierarchy 1 and computer electronic complex 1 connects to virtual hierarchy 1 through peripheral component interconnect host bridge 2 (PHB2) 706 through peripheral component interconnect express link 714 to multi-root switch 1 719. Computer electronic complex 1 secondary virtual hierarchy connection is virtual hierarchy 3 connecting to virtual hierarchy 3 through peripheral component interconnect host bridge 3 (PHB3) 707 through peripheral component interconnect express link 718 to multi-root switch 2 720. Similarly, computer electronic complex 2 primary virtual hierarchy is virtual hierarchy 4 connecting to virtual hierarchy 4 through peripheral component interconnect host bridge 5 (PHB5) 709 through peripheral component interconnect express link 715 to multi-root switch 2 720. Computer electronic complex 2 secondary virtual hierarchy connection is virtual hierarchy 2 connecting to virtual hierarchy 2 through peripheral component interconnect host bridge 4 (PHB4) 708 through peripheral component interconnect express link 717 to multi-root switch 1 719.

The "secondary" link is not necessarily just for backup purposes, but is also used for communications to devices depending on the switch under which the devices are located. Typically the shortest path from device to computer electronic complex is used, which is the path through the fewest number of switches, to reduce the operational latency. A path through multiple switches would then typically be reserved for backup purposes. Peripheral component interconnect express links 721, 722 provide the cross-switch connections to provide alternate paths.

Below each multi-root switch is shown two multi-root devices. Multi-root device 1 727, is shown as a network device that connects to the network by connection 738 multi-root switch 1 727 via peripheral component interconnect express link 723. Similarly, multi-root device 2 728 is shown as a network device that connects to the network via connection 739 and to multi-root switch 2 via peripheral component interconnect express link 726.

For redundancy reasons, the two network adapter connections 738, and 739 would most likely connect to an external network switch and both devices would have access to the same network. That way, if one network adapter failed, both central electronic complexes would still have access to the network via the remaining adapter. In addition to the network adapters 727, 728, are two disk adapters, as multi-root device 3 729 and multi-root device 4 730, with both of these devices given access to the same set of disk drives 731. Multi-root device 3 729 is connected via peripheral component interconnect express link 724 to multi-root switch 1 719 and multi-root device 4 730 is connected via peripheral component interconnect express link 725 to multi-root switch 2 720.

In this example, multi-root device 1 727 has access to four virtual hierarchies, namely virtual hierarchy 1 732, virtual hierarchy 2 733, virtual hierarchy 3 734, and virtual hierarchy 4 735. Each of these virtual hierarchies would normally be associated with a separate peripheral component interconnect express function. For example, virtual functions, in which each of the functions would be separated by firewalls 737 such that one virtual function could not get access to a virtual hierarchy of another virtual function. Firewall tunnel 736 may be created between virtual hierarchy 1 732 and virtual hierarchy 2 733 (for example, between virtual function 1 and virtual function 2 of multi-root device 727), allowing multi-root device 1 727 to direct memory access data to memory 703, and memory 704 in both computer electronic complexes which are connected to different sets of virtual hierarchies.

Multi-root device 1 727 is logically similar to peripheral component interconnect express multi-root input/output virtualization end point 500 shown in FIG. 5A. As such, it contains virtual function to virtual hierarchy authorization tables 510 in FIGS. 5A and 610 in FIG. 6B and virtual function work queues 511 in FIG. 5A with virtual function work queue entries 601 in FIG. 6A. Trusted software as in multi-root—peripheral component interconnect manager 711 has setup the virtual function to virtual hierarchy authorization tables to allow a virtual function to get access to both virtual hierarchy 1 732 and virtual hierarchy 2 733, essentially forming a tunnel through firewall tunnel 736.

Other embodiments of a tunnel through the firewall may be used. For example, a capability for one virtual function to create a communication path to another virtual function by some means and pass the information to the other virtual function, along with the operation to perform on the data may be provided. The other means would also require a secure method of setting up such means, like the mechanism described, so that the tunnel through the firewall could be controlled by a trusted piece of code.

The following describes an operation of receiving data from network link 738 which is destined to be written to disk. A device driver in computer electronic complex 1 701 which is responsible for handling the virtual function creates receive buffers in system memory 703. In addition, computer electronic complex 1 701 has communicated with a corresponding driver in computer electronic complex 2 702, for example by using a network connection between the two computer electronic complexes. The corresponding computer electronic complex 2 702 driver has allocated corresponding receive buffers in system memory 704 and then has communicated the address of the receive buffers to the driver in computer electronic complex 1 701. The driver in computer electronic complex 1 701 then sets up a virtual function work queue entry in the virtual function of multi-root device 1 727 that points to the computer electronic complex 1 701 receive buffer via virtual hierarchy 1 732 and the computer electronic complex 2 702 receive buffer via virtual hierarchy 2 733. Upon receiving a communication packet by the virtual function, the virtual function uses the information given in the virtual function work queue entry to identify where the buffers are located, and then verifies the authority of the virtual function to tunnel through the firewall by use of the virtual function to virtual hierarchy authorization table 610 in FIG. 6B that corresponds to the virtual function. If the authorization passes, multi-root device 1 727 then direct memory accesses the data via virtual hierarchy 1 732 into system memory of central electronic complex 1 701 and then direct memory access the data via virtual hierarchy 2 733 into system memory 704 of computer electronic complex 2 702. On successful completion of these direct memory accesses, the device driver gets signaled by an interrupt from multi-root device 1 727 and detects the operation completed successfully to both computer electronic complexes. At this point the data is safe from a failure in one of the computer electronic complexes, and the operation can be considered to have successfully completed. At this point the originator of the disk write operation is told it is complete, even though it is still not on disk, because the data is safe from a system crash, for example. The device driver in computer electronic complex 1 701 then queues up a disk write operation through multi-root device 3 729.

With further reference to FIG. 7, multiple paths through the multi-root fabric consisting of the two multi-root switches are presented. For example, if there had been a failure of link virtual hierarchy 717, then the multi-root device would not be able to perform a write to system memory 704 as described above. If the multi-root device implements the redundant table shown in FIG. 6C, then when the path from multi-root device 1 727 to computer electronic complex 2 702 through that link is not operational, the table shown in FIG. 6C can be used to determine there is an alternate path by virtual hierarchy 4 735 instead of virtual hierarchy 2 733, and the data would flow through link 723 through multi-root switch 1 719 through peripheral component interconnect express links 721, 722 through multi-root switch 2 720, through peripheral component interconnect express link 715, through peripheral component interconnect host bridge 5 (PHB5) 709 to system memory 704.

Figure 8:
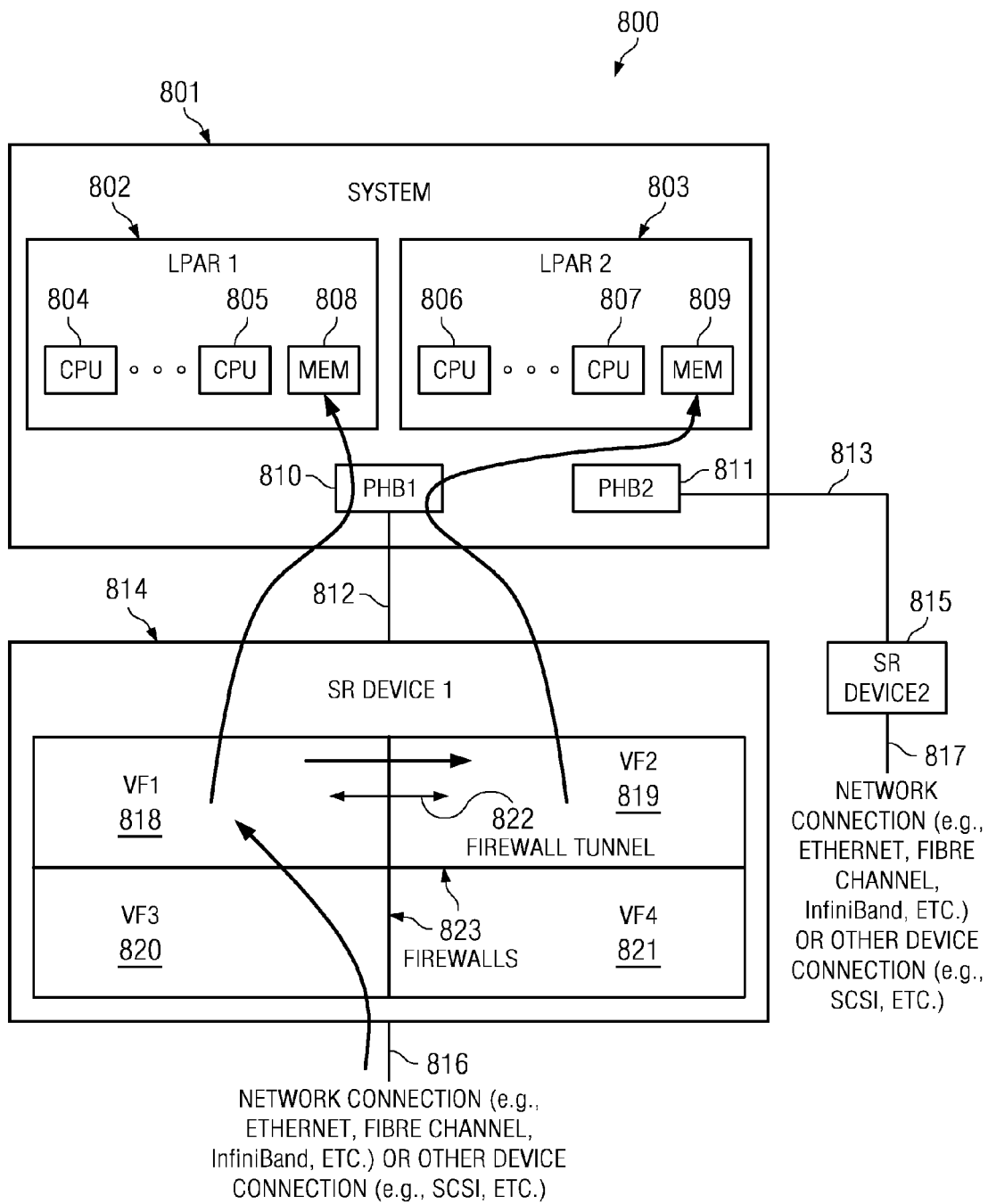
FIG. 8 is a block diagram of a configuration of redundant logical partitions using a single root device, in accordance with an illustrative embodiment.

With reference to FIG. 8, a block diagram of a configuration of redundant logical partitions using only a single root device, in accordance with an illustrative embodiment. As a further example of logical partitioned platform 400 of FIG. 4, configuration 800 is presented in which there is no concept of multiple virtual hierarchies. Instead of having separate virtual hierarchies, there is a concept of having direct memory access address ranges assigned to the virtual functions. Single system 801 consists of multiple logical partitions 802-803, each with one or more central processing units 804-807, and each central processing unit with memory 808-809. The logical partitions share one or more peripheral component interconnect host bridges (PHBs) 810-811, and single root devices 814-815 are connected to the peripheral component interconnect host bridges through peripheral component interconnect express links 812-813. The single root devices are shown as network adapters, and the devices are connected to the network through links 816-817. As in FIG. 7, the two network links would be connected to a network switch (not shown), so that both links could get access to the same network if the other link failed. Also, as in the FIG. 7, virtual functions 818-821 are separated by firewalls 823, and firewall tunnel 822 is created to permit a virtual function to access the logical partition memory of another virtual function. The access differs from the standard peripheral component interconnect express input/output virtualization specification which requires each virtual function to access the memory of one and only one logical partition.

The data structures that allow the single-root tunneling are similar to what is needed for the multi-root case, which are shown in FIG. 6B. Instead of the tables containing the virtual hierarchy, each authorized virtual hierarchy number is replaced by an authorized peripheral component interconnect express direct memory access address range. The single-root peripheral component interconnect manager, (not shown), similar to the multi-root peripheral component interconnect manager in the multi-root case, allocates the peripheral component interconnect express address ranges and sets up the virtual function to address range authorization tables 628 in FIG. 6D. The software in the logical partitions is not given access to the table, so that one logical partition cannot get access to the memory of another logical partition, unless explicitly setup, as it was for the virtual hierarchies in the multi-root case. As in the FIG. 7 multi-root case, the two logical partitions communicate in the same manner as the software did in the computer electronic complexes of the multi-root case, to setup receive buffers. Virtual function work queue entry 642 in FIG. 6E does include the virtual hierarchy number in this case; however the operation address, such as 648 in FIG. 6E may be used as a path identifier.

Two logical partitions are shown in FIG. 8, but those skilled in the art will recognize that more than a two-way redundant set of logical partitions could be constructed. As shown, the virtual function may be one of a multi-root peripheral component interconnect device virtual function and a single root peripheral component interconnect device virtual function.

Figure 9:
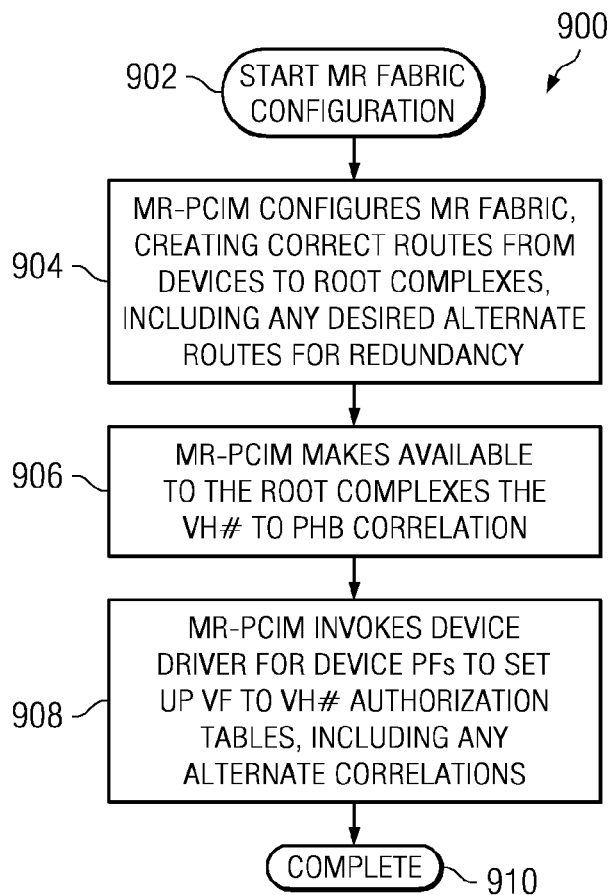
FIG. 9 is a flowchart of a process of multi-root fabric configuration of an multi-root multi-system configuration in accordance with an illustrative embodiment.

With reference to FIG. 9, a flowchart of a process of multi-root fabric configuration of a multi-root multi-system configuration in accordance with an illustrative embodiment is presented. Configuration process 900 is an example of a configuration process of configuration manager 364 of FIG. 3 providing a configuration as shown in FIG. 7. Configuration process 900 starts (step 902) and the multi-root peripheral component interconnect manager configures the multi-root fabric (step 904). Configuring the multi-root fabric creates correct routes from devices to root complexes, including any desired alternate routes for redundancy. The multi-root peripheral component interconnect manager makes available to the root complexes the virtual hierarchy numbers to peripheral component interconnect host bridge (PHB) correlation (step 906). The multi-root peripheral component interconnect manager invokes a device driver for device physical functions to set up virtual function to virtual hierarchy numbers authorization tables, including any alternate correlations (step 908) with configuration process 900 terminating thereafter (step 910).

Figure 10:
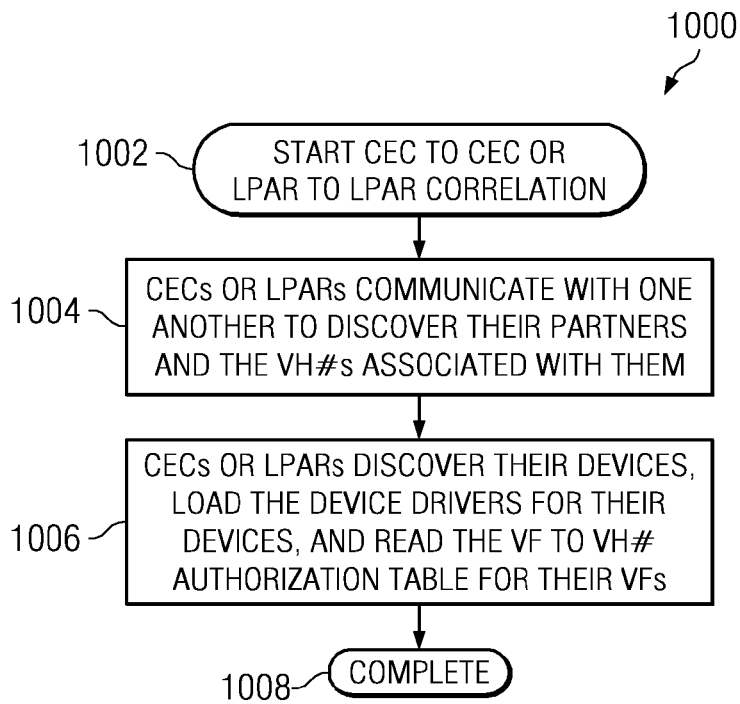
FIG. 10 is a flowchart of a process for a system to determine the virtual hierarchy numbers required for communicating to partner systems, in accordance with an illustrative embodiment.

With reference to FIG. 10, a flowchart of a process allowing a system to determine the virtual hierarchy numbers required for communicating to partner systems, in accordance with an illustrative embodiment is presented. Process 1000 is as example of a process using the configuration of FIG. 7 by root node 360 and root node 361 or the configuration of FIG. 8 and logical partition 403 and logical partition 405 of FIG. 4.

Process 1000 starts (step 1002) and the computer electronic complexes communicate with one another or when logical partitions are used, logical partitions communicate with one another to discover respective partners and the virtual hierarchy numbers associated with a partner (step 1004). Each of the computer electronic complexes or logical partitions discover the devices associated with the respective complex or partition, load the device drivers for their respective discovered devices, and read the virtual function to virtual hierarchy number authorization table for their respective virtual functions (step 1006). The device drivers now have the virtual hierarchy numbers needed to setup the appropriate virtual function work queue entries 601 of FIG. 6A. Process 1000 terminates thereafter (step 1008).

Figure 11:
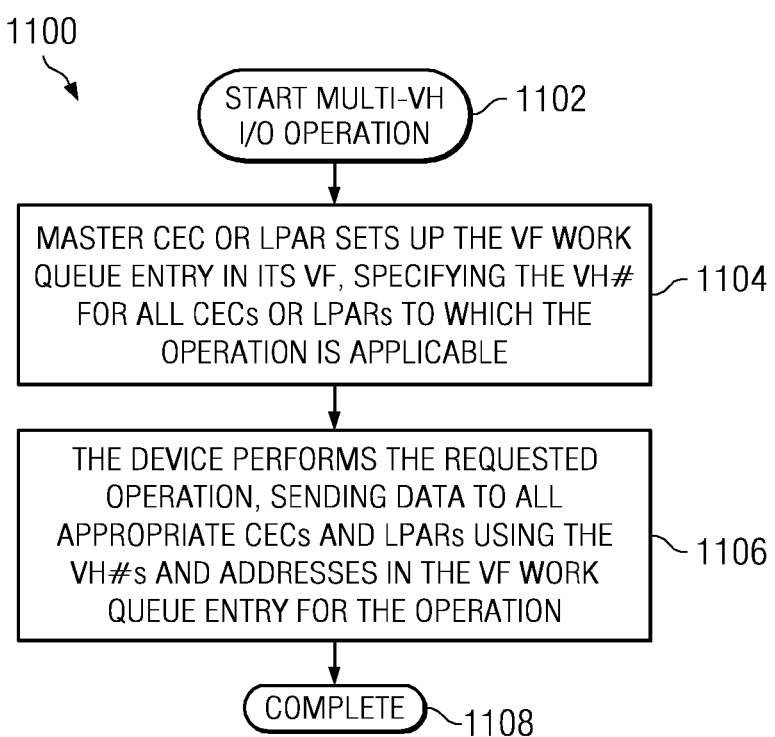
FIG. 11 is a flowchart of a process to setup a virtual function work queue entry in accordance with an illustrative embodiment.

With reference to FIG. 11, a flowchart of a process to setup of a virtual function work queue entry in accordance with one illustrative embodiment is presented. Process 1100 is an example of process to establish a virtual function work queue entry 511 of FIG. 5 by central electronic complex, such as CEC 1 701 of FIG. 7 or LPAR 1 802 of FIG. 8. Process 1100 starts (step 1102) and the master computer electronic complex or logical partition sets up the virtual function work queue entry in the system virtual function (step 1104). The entry created specifies the virtual hierarchy number for all computer electronic complexes or logical partitions to which the operation is applicable. The master computer electronic complex or logical partition is where the device driver resides for a particular operation. All computer electronic complexes or logical partitions can have master operations executing simultaneously. That is, one computer electronic complex or logical partition may take part of the workload and control that part, and another computer electronic complex or logical partition may take another part of the workload, in order to spread the workloads between the various computer electronic complexes or logical partitions.

The device performs the requested operation, sending the data to the system memory of all appropriate computer electronic complexes or logical partitions using the virtual hierarchy numbers and addresses in the virtual function work queue entry for the operation (step 1106). Process 1100 terminates thereafter (step 1108).

Figure 12:
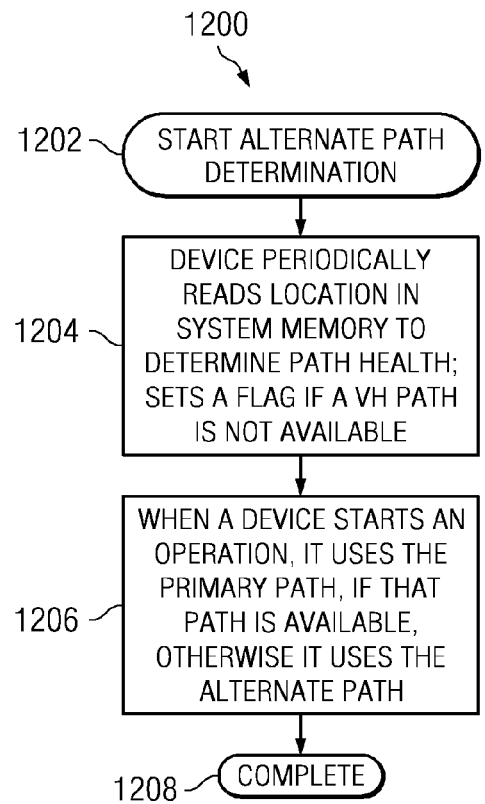
FIG. 12 is a flowchart of a process for dynamically determining input/output fabric path operational status and use of an alternate path when necessary, in accordance with an illustrative embodiment.

With reference to FIG. 12, a flowchart of a process for dynamically determining input/output fabric path operational status and use of an alternate path, in accordance with an illustrative embodiment is presented. Process 1200 is an example of a process of a device, such as MR device 1 727 of FIG. 7 to determine path availability. Process 1200 starts (1202) and a device periodically determines the operational status of a virtual hierarchy path to system memory, setting a flag if the virtual hierarchy path is not available (step 1204). For example, the device reads a location in system memory via direct memory access and if the device receives an error on the read, such as an operation timeout, the device marks the path as not available. Typically the device starts an operation, on the primary path if that path is available; otherwise the device uses the alternate path (step 1206). Process 1200 terminates thereafter (step 1208).

Figure 13:
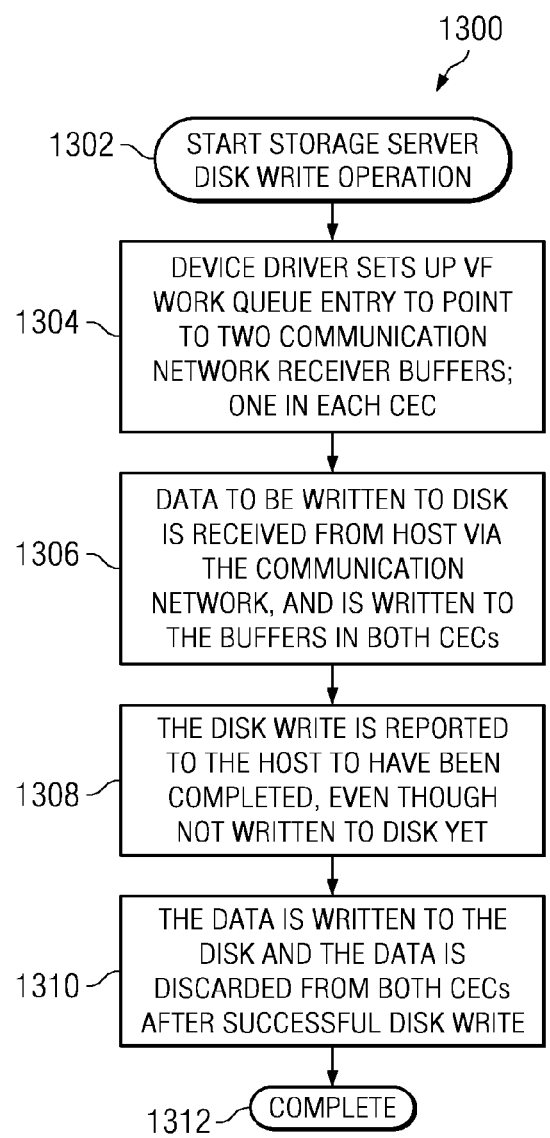
FIG. 13 is a flowchart of a process of performing a write operation using dual paths for data replication, in accordance with an illustrative embodiment.

With reference to FIG. 13, a flowchart of a process of performing a write operation using dual paths for data replication in accordance with an illustrative embodiment is presented. Process 1300 is an example of a device driver portion of central electronic complex, such as CEC 1 701 of FIG. 7 or LPAR 1 802 of FIG. 8. Process 1300 is an example of a dual path disk write operation, but more or multiple paths may be used as well. For example, a write operation may include a set of paths, wherein the set includes more than two paths. Process 1300 of the storage server disk write operation starts at (step 1302) and a device driver sets up a virtual function work queue entry to point to two communication network receive buffers; one receive buffer located in each central electronic complex (step 1304). The data to be written to disk is received from a host via the communication network, and is written to the buffers in both central electronic complexes (step 1306). The write operation to each receive buffer occurs concurrently or approximately at the same time. The disk write operation is reported back to the host as having been completed, even though the data has not written to disk yet (step 1308). The data is physically written to the disk and the data is discarded from the memory of both central electronic complexes after a successful completion of the disk write (step 1310). Process 1300 terminates thereafter (step 1312).

Illustrative embodiments thus provide a capability for a single function of an input/output virtualization device to gain access to multiple systems through multiple paths between the multiple systems. In particular, the single function may be permitted access to multiple virtual hierarchies of the input/output fabric to establish redundant communication paths. The establishment of redundant systems enables data to be sent to more than one system of the multiple systems for data integrity reasons or to access data in more than one system from the same function of the same input/output virtualization adapter. In an illustrative embodiment, permission is established though use of virtual function to virtual hierarchy authorization correspondence tables or virtual function to address range authorization tables. The correspondence specifically permits a function to tunnel through a firewall separating virtual functions or virtual hierarchies, to use a resource of another virtual function or virtual hierarchy associated with the resource.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for creating redundant system configurations, the method comprising:
   creating a set of virtual function path authorization tables, by a trusted entity, wherein entries define access for a specified virtual function, comprising a specified function within an input/output virtualization enabled end-point sharing one or more single root or a multi-root peripheral component interconnect (PCI) devices, to a set of logical address ranges in a plurality of systems and the entries further defining a boundary preventing invalid cross function access, wherein each system in the plurality of systems comprises at least one processor and associated memory with a logical address assigned to each logic component in each system to form a portion of the set of logical address ranges, wherein the specified virtual function is performed by the single root or the multi-root PCI device, wherein each entry in the path authorization tables contains a primary communication path and an alternative communication path for routing between the specified virtual function and a logical address range in one of the plurality of systems;
   receiving a request from a requestor to perform a disk write operation to write data to a disk;
   responsive to receiving the request from the requestor to perform the disk write operation, creating both a first receive buffer in a first selected logical address range in the set of logical address ranges and a second receive buffer in a second selected logical address range in the set of logical address ranges, wherein the second selected address range is on a different system than the first selected logical address range;
   responsive to creating the first receive buffer and second receive buffer, creating a virtual function work queue entry for the specified virtual function containing a logical address of the first and second receive buffers in the first and second selected logical address ranges;
   determining, from the set of virtual function path authorization tables, whether the specified virtual function is authorized to use the first and second selected logical address ranges based on a table entry for the specified function and a set of permitted logical addresses;
   responsive to a determination that the specified virtual function is authorized, writing the data into the first and second receive buffers of the first and second selected logical address ranges in the plurality of systems; and
   responsive to writing the requested data into the first and second receive buffers, reporting to the requestor that the data has been physically written to the disk and that the disk write operation is complete, before the data is physically written to the disk.

2. The computer-implemented method of claim 1, wherein the first selected logical address range, and the second selected logical address range each comprise a plurality of memory addresses.

3. The computer-implemented method of claim 1, wherein the set of virtual function path authorization tables contains a correspondence between each specified virtual function of a plurality of specified virtual functions and a set of virtual hierarchies, wherein one of the plurality of specified virtual functions uses the correspondence to tunnel through a firewall separating each of the plurality of specified virtual functions in order to use a resource of another of the plurality of specified virtual functions.

4. The computer-implemented method of claim 1, wherein the set of virtual function path authorization tables contains a correspondence between each specified virtual function of a plurality of specified virtual functions and a set of logical address ranges in a set of logical partitions, wherein one of the plurality of specified virtual functions uses the correspondence to tunnel through a firewall separating each of the plurality of specified virtual functions in order to use a resource of another of the plurality of specified virtual functions.

5. The computer-implemented method of claim 1, wherein the primary communication path is a preferred path, and responsive to the primary communication path being unavailable, using the alternative communication path.

6. The computer-implemented method of claim 1, wherein a presence of an entry in the set of virtual function path authorization tables, created by the trusted entity, permits access for the specified virtual function to a system in the plurality of systems by the primary communication path and the alternative communication path.

7. The computer-implemented method of claim 1, wherein an absence of an entry in the set of virtual function path authorization tables, created by the trusted entity, prevents access for the specified virtual function to a system in the plurality of systems by the primary communication path and the alternative communication path.

8. A data processing system for creating redundant system configurations, comprising:
   a bus;
   a memory connected to the bus, wherein the memory comprises computer-executable instructions;

a central processor unit, wherein the central processor unit executes the computer-executable instructions to direct the data processing system to:
create a set of virtual function path authorization tables, by a trusted entity, wherein entries define access for a specified virtual function, comprising a specified function within an input/output virtualization enabled endpoint sharing one or more single root or a multi-root PCI devices, to a set of logical address ranges in a plurality of systems and the entries further defining a boundary preventing invalid cross function access, wherein each system in the plurality of systems comprises at least one processor and associated memory with a logical address assigned to each logic component in each system to form a portion of the set of logical address ranges, wherein the specified virtual function is performed by the single root or the multi-root PCI device, wherein each entry in the path authorization tables contains a primary communication path and an alternative communication path for routing between the specified virtual function and a logical address range in one of the plurality of systems;
receive a request from a requestor to perform a disk write operation to write data to a disk;
responsive to receiving the request from the requestor to perform the disk write operation, create both a first receive buffer in a first selected logical address range in the set of logical address ranges and a second receive buffer in a second selected logical address range in the set of logical address ranges, wherein the second selected logical address range is on a different system than the first selected logical address range;
responsive to creating the first receive buffer and second receive buffer, create a virtual function work queue entry for the specified virtual function containing a logical address of the first and second receive buffers in the first and second selected logical address ranges;
determine, from the set of virtual function path authorization tables, whether the specified virtual function is authorized to use the first and second selected logical address ranges based on a table entry for the specified function and a set of permitted logical addresses;
responsive to a determination that the specified virtual function is authorized, write the data into the first and second receive buffers of the first and second selected logical address ranges in the plurality of systems; and
responsive to writing the requested data into the first and second receive buffers, report to the requestor that the data has been physically written to the disk and that the disk write operation is complete, before the data is physically written to the disk.

9. The data processing system of claim 8, wherein the first selected logical address range, and the second selected logical address range each comprise a plurality of memory addresses.

10. The data processing system of claim 8, wherein the set of virtual function path authorization tables contains a correspondence between each specified virtual function of a plurality of specified virtual functions and a set of virtual hierarchies, wherein one of the plurality of specified virtual functions uses the correspondence to tunnel through a firewall separating each of the plurality of specified virtual functions in order to use a resource of another of the plurality of specified virtual functions.

11. The data processing system of claim 8, wherein the set of virtual function path authorization tables contains a correspondence between each specified virtual function of a plurality of specified virtual functions and a set of logical address ranges in a set of logical partitions, wherein one of the plurality of specified virtual functions uses the correspondence to tunnel through a firewall separating each of the plurality of specified virtual functions in order to use a resource of another of the plurality of specified virtual functions.

12. The data processing system of claim 8, wherein the primary path is a preferred path, and responsive to the primary communication path being unavailable, using the alternative communication path.

13. The data processing system of claim 8, wherein a presence of an entry in the set of virtual function path authorization tables, created by a trusted entity, permits access for the specified virtual function to a system in the plurality of systems by the primary communication path and the alternative communication path.

14. The data processing system of claim 8, wherein an absence of an entry in the set of virtual function path authorization tables, created by a trusted entity, prevents access for the specified virtual function to a system in the plurality of systems by the primary communication path and the alternative communication path.

15. A computer program product for creating redundant system configurations, comprising:
a non-transitory computer-readable storage medium having computer-executable instructions stored thereon, the computer-executable instructions comprising:
computer-executable instructions for creating a set of virtual function path authorization tables, by a trusted entity, wherein each entry defines access for a specified virtual function, comprising a specified function within an input/output virtualization enabled endpoint sharing one or more single root or a multi-root peripheral component interconnect devices, to a set of logical address ranges in a plurality of systems and the entry further defining a boundary preventing invalid cross function access, wherein each system in the plurality of systems comprises at least one processor and associated memory with a logical address assigned to each logic component in each system to form a portion of the set of logical address ranges, wherein the specified virtual function is performed by the single root or the multi-root peripheral component interconnect device, wherein each entry in the path authorization tables contains a primary communication path and an alternative communication path for routing between the specified virtual function and a logical address range in one of the plurality of systems;
computer-executable instructions for receiving a request from a requestor to perform a disk write operation to write data to a disk;
computer-executable instructions, responsive to receiving the request from the requestor to perform the disk write operation, for creating both a first receive buffer in a first selected logical address range in the set of logical address ranges and a second receive buffer in a second selected logical address range in the set of logical address ranges, wherein the second selected logical address range is on a different system than the first selected logical address range;
computer-executable instructions, responsive to creating the first receive buffer and second receive buffer, for creating a virtual function work queue entry for the specified virtual function containing a logical address of the first and second receive buffers in the first and second selected logical address ranges;
computer-executable instructions for determining, from the set of virtual function path authorization tables, whether the specified virtual function is authorized to use the first and second selected logical address ranges based on s table entry for the specified function and a set of permitted logical addresses;

computer-executable instructions responsive to a determination that the specified virtual function is authorized, for writing the data into the first and second receive buffers of the first and second selected logical address ranges in the plurality of systems; and computer-executable instructions responsive to writing the requested data into the first and second receive buffers, for reporting to the requestor that the data has been physically written to the disk and that the disk write operation is complete, before the data is physically written to the disk.

16. The computer program product of claim 15, wherein the first selected logical address range, and the second selected logical address range each comprise a plurality of memory addresses.

17. The computer program product of claim 15, wherein the set of virtual function path authorization tables contains a correspondence between each specified virtual function of a plurality of specified virtual functions and a set of virtual hierarchies, wherein one of the plurality of specified virtual functions uses the correspondence to tunnel through a firewall separating each of the plurality of specified virtual functions in order to use a resource of another of the plurality of specified virtual functions.

18. The computer program product of claim 15, wherein the set of virtual function path authorization tables contains a correspondence between each specified virtual function of a plurality of specified virtual functions and a set of logical address ranges, wherein one of the plurality of specified virtual functions uses the correspondence to tunnel through a firewall separating each of the plurality of specified virtual functions in order to use a resource of another of the plurality of specified virtual functions.

19. The computer program product of claim 16, wherein a presence of an entry in the set of virtual function path authorization tables, created by the trusted entity, permits access for the specified virtual function to a system in the plurality of systems by the primary path and the alternative path.

20. The computer program product of claim 16, wherein an absence of an entry in the set of virtual function path authorization tables, created by the trusted entity, prevents access for the specified virtual function to a system in the plurality of systems by the primary communication path and the alternative communication path.

* * * * *